United States Patent
Liang

(10) Patent No.: US 9,111,364 B2
(45) Date of Patent: Aug. 18, 2015

(54) METHOD OF CONTENT AWARE IMAGE RESIZING

(71) Applicant: COREL CORPORATION, Inc., Ottawa (CA)

(72) Inventor: Clare Liang, Zhudong Township (TW)

(73) Assignee: Corel Corporation, Ottawa, Ontario (CA)

( * ) Notice: Subject to any disclaimer, the term of this patent is extended or adjusted under 35 U.S.C. 154(b) by 81 days.

(21) Appl. No.: 13/937,098

(22) Filed: Jul. 8, 2013

(65) Prior Publication Data

US 2014/0023293 A1 Jan. 23, 2014

Related U.S. Application Data

(63) Continuation of application No. 12/691,765, filed on Jan. 22, 2010, now Pat. No. 8,483,513.

(51) Int. Cl.
*G06K 9/32* (2006.01)
*G06T 3/40* (2006.01)
*G06T 1/00* (2006.01)

(52) U.S. Cl.
CPC ............... *G06T 3/4007* (2013.01); *G06T 1/00* (2013.01)

(58) Field of Classification Search
USPC .......................... 345/612, 660, 669, 671, 698; 348/E7.006; 382/194, 221, 298; 701/455; 715/800, 815, 838
See application file for complete search history.

(56) References Cited

U.S. PATENT DOCUMENTS

| | | | |
|---|---|---|---|
| 6,470,094 B1* | 10/2002 | Lienhart et al. | 382/176 |
| 2008/0112684 A1* | 5/2008 | Matsushita et al. | 386/52 |
| 2010/0124371 A1* | 5/2010 | Jiang et al. | 382/162 |
| 2010/0268301 A1* | 10/2010 | Parikh et al. | 607/54 |
| 2011/0025841 A1* | 2/2011 | Cunningham et al. | 348/135 |
| 2011/0255589 A1* | 10/2011 | Saunders et al. | 375/240.01 |

OTHER PUBLICATIONS

Achanta et al., "Saliency Dectection for Content-Aware Image Resizing," 16th IEEE International Conference on Image Processing, Nov. 2009, (p. 1-4) Cairo, Egypt.*
Achanta et al., "Saliency Dectection for Content-Aware Image Resizing," 16th I EEE International Conference on Image Processing, Nov. 2009, (p. 1-4) Cairo, Egyp.*

* cited by examiner

Primary Examiner — Gregory F Cunningham
(74) Attorney, Agent, or Firm — Rosenberg, Klein & Lee

(57) ABSTRACT

Audiovisual content presentation to users has evolved from users receiving hardcopy printed materials to their searching and retrieving information by accessing any of hundreds of millions of web sites and billions of web pages. User retrieval being performed on a wide variety of platforms from high performance PCs to low performance cellular telephones. Accordingly substantial limitations exist in initially displaying this audiovisual content as well as when users dynamically manipulate browser dimensions or move through the content. Further additional limitations exist for those authoring both online and traditional content to manipulate sourced content to provide the published content. As such a requirement exists for dynamically resizing images that respects the information content within the audiovisual content. Embodiments of the invention provide for content aware resizing of audiovisual content both within authoring and user environments, and in dependence upon device characteristics such as display, processor, power, etc.

29 Claims, 21 Drawing Sheets

METHOD OF CONTENT AWARE IMAGE RESIZING

CROSS-REFERENCE TO RELATED APPLICATION

This application is a continuation of co-pending U.S. patent application Ser. No. 12/691,765 filed Jan. 22, 2010. The aforementioned related patent application is herein incorporated by reference in its entirety.

FIELD OF THE INVENTION

This invention relates to image processing and more specifically to content aware image re-dimensioning.

BACKGROUND OF THE INVENTION

In the last fifteen years or so accessing, generating and exchanging information has fundamentally shifted for Governments, commercial enterprises, private and public organizations, and the general public. In those fifteen or so years the Internet has gone from a niche application to an essential element of the lives of most individuals in the developed world. As of Jul. 1, 2009 it was estimated that the number of Internet users had exceeded 1.67 billion people out of a world population of approximately 6.8 billion, i.e. 25% of the world's population. These users are accessing information contained in approximately 22 billion pages hosted on over 110 million websites (http://www.domaintools.com/internet-statistics).

Over the same period of time how the Internet is accessed has shifted dramatically as well. No longer are users sitting at desktop personal computers (PCs) in front of 15" or 17" CRT displays interfaced to large metal cases hosting for example a single Intel® 486 processor operating 50 MHz or 100 MHz with 32 MB memory with a 16 GB hard-drive accessing dial-up connectivity at 56 kb/s. Today their desktop PC is most likely to be a laptop PC working alone or in conjunction with a LCD display of dimension 17", 19", 21", etc up to 32" or more for graphical designers allowing them to unplug and move to another location to continue working. This laptop for example containing an AMD Athlon™ Dual-Core 2.00 GHz processor with 4 GB memory, a 500 GB hard-drive, and with Internet connectivity at 5 Mb/s, 10 Mb/s or more through wireless WiFi (IEEE 802.11) or WiMAX (IEEE 802.16) interfaces.

Additionally a multitude of other portable electronic devices now provide their users with Internet access including for example personal digital assistants (PDAs) and cellular telephones (e.g. Apple iPhone, Research in Motion's Blackberry, Palm Pre, Samsung Chocolate), gaming consoles (e.g. Microsoft Xbox, Nintendo DSi, Nintendo Wii), and audiovisual media players (e.g. Apple iPod). Accordingly users can access the Internet essentially anywhere and anytime with one of several devices they typically posses. Further recent device developments such as the Apple iPhone® with integrated silicon MEMS devices allow for dynamic rotation of the mobile device display between landscape and portrait formats as the user rotates their device. Further, operating systems such as Microsoft's Windows and Apple's MAC OS X allow users to dynamically change the size and effective orientation of web pages on their computers, and newer introductions such as Microsoft Window 7 allow users to dynamically move and display directly content from their laptop PC to another device such as another laptop, television, PDA etc.

As a result the original consideration of images on mobile devices as simply wallpaper and screen savers or web site content as being displayed on large portrait orientated PC displays has been destroyed. Audiovisual content posted to the Internet within any web page is dynamically accessed, dynamically adjusted, and is highly manipulated. A news image may be accessed within seconds by millions of users with displays from typical cellular telephone 240×320 and 320×480 pixel displays of 2.S" or 3.2" through to IS" or 17" displays of 1920×1080p supporting HDTV and above to 32", 42" LCD, plasma displays, and projectors as users employ their televisions as monitors.

Further users expectations have increased during this time. Applications such as Microsoft Word and Corel WordPerfect have evolved from being simple word processing applications to entry level desktop publishing suites supporting graphics and audiovisual content and the generation of web pages. At the same time desktop publishing software has expanded to facilitate direct handling of XML, HTML languages, multiple interfaces to digital audio, digital photo, and digital video applications and allowing direct publication in printed formats, secured digital content, and web content.

However, despite all these advances the content published onto Internet web pages is in the vast majority of cases fixed, even from leading content providers such as Yahoo and Google. Hence, as the viewing user adjusts the dimensions of their web page, for example allowing them to view the Internet content whilst working on another application without having to move from one application to another, then essentially their web page acts similar to a window adjusting the amount of the web page they can view but the audiovisual content is typically fixed in size. In the other cases, for example Google image search, the content is adjusted to a limited extent according to the dimensions of the web browser page, for example the number of images across the web browser page changes. However, the image sizes remain constant and the user must now scroll further to view all the images and move to the next page. In others the page layout adjusts to display the text according to the web browser page size but again the dimensions of the image have been fixed. Today image manipulation in respect of adjusting displayed dimensions of an image is essentially limited to the desktop publisher's domain when generating the web page content. The user's ability to control the display of the web page content is limited to either adjusting the web browser page size or adjusting the zoom that the web browser displays content with.

It would be beneficial for audiovisual content presented to a user to be dynamically displayed according to a variety of factors including but not limited to the dimensions of the web browser page, image display device dimensions, and image display device resolution for example. In this manner disadvantages of the prior art that will become evident in the descriptions of these approaches will be removed.

Amongst the earliest prior art techniques for image adjustment to reflect a change in displayed dimensions is cropping, such as shown in FIG. 1, where two desktop publisher snapshot images 100 and 150 are shown. First desktop publisher snapshot image 100, from Adobe Photoshop Lightroom® shows an image of a bride 110 together with a cropped highlighted region 120 which the user will select as the cropped image to employ. Similarly second desktop publisher snapshot image 150, from Adobe Photoshop shows a cityscape 160 together with a cropped cityscape region 170 which the user has selected as the cropped image to employ. Second desktop publisher snapshot image 150 also has icon 180 that projects an automatically generated mask onto the cityscape 160 at either a predetermined pixel count or physical dimension. However, this prior art approach only works to reduce an image dimension, it cannot scale the image up, and if automatically generated may remove significant content in the image. Cropping does not scale the source image even when reducing the displayed dimensions and has typically been limited to date therefore to desktop publishing.

Within the prior art there are many approaches to automate the cropping operation by detecting content and cropping in dependence of the content. Examples include A. T. Schowkta in U.S. Pat. No. 7,133,050 entitled "Automated Image Resizing and Cropping", Suh et al in "Automated Thumbnail Cropping and its Effectiveness (UIST'03 Proc. 16th ACM Symposium User Interface Software and Technology, ACM Press, New York, pp. 95-104, 2003), A. Santella et al in "Gaze-Based Interaction for Semiautomatic Photo Cropping" (Proc. SIGCHI Conference on Human Factors in Computing Systems, pp. 771-780, 2006) and E. G. Callway in US Patent 2007/0,152,990 entitled "Image Analyzer and Adaptive Image Scaling Circuit and Methods".

Within the prior art such cropping methodologies have been employed in conjunction with linear and non-linear scaling methodologies to provide images of variable size. Linear and non-linear scaling allows the generation of images that are both larger and smaller than the original whilst cropping adjusts the image content. Such a non-linear technique being shown in FIG. 2 by resizing tool window 200, as provided by SB Software (Nonlinear Image Resizing Tool, Version 1.0, www.sb-software.com). As shown within resizing tool 200 an original image 210 of dimensions 747×923 pixels has been selected for resizing to resized image 220 of dimensions 1024×768 pixels representing an aspect ratio change from 0.81:1 to 1.33:1. As indicated by resizing setting toolbar 230 the user can apply nonlinear factors that range from squeezing the centre of the image and stretching the edges of the image through to the reverse of stretching the centre of the image and squeezing the edges of the image. Such a non-linear scaling whilst an improvement over linear scaling in many instances can still result in unnatural images, particularly as the human visual process is highly sensitive to distortion and non-linearity.

Extensions of this technique to reduce such visual irregularities and reduce the user perceptions that image manipulation has been undertaken have included A. Soroushi in U.S. Pat. No. 7,355,610 entitled "Method and Apparatus for Expanding Image Data to Create Enlarged Images for Display", Y-H. Lee in US Patent Application 2007/0,147,708 entitled "Adaptive Image Size Conversion Apparatus and Method Thereof", and C-H. Chou in US Patent Application 2007/0,104,394 entitled "Method and System for Digital Image Magnification and Reduction." However, such whilst addressing the automation aspect of dynamically adjusting images to different display devices or varying web browser page dimensions they have drawbacks in terms of requiring significant processing complexity even if they can be implemented in the firmware of devices or require additional specific hardware.

It would be apparent that a requirement for a solution addressing high volume consumer applications of image display would be beneficially provided without requiring additional hardware and in a software I firmware form that operates within a wide range of portable devices with varying processing capabilities. Further such firmware should beneficially operate rapidly to provide real time image resizing and with low power consumption to extend the portable device lifetime to the user. Such a focus within the prior art is typically absent as most prior art applications have focused to desktop publishing type applications such as Adobe Photoshop, Corel PhotoShop, Microsoft PowerPoint, and Microsoft Publisher for example wherein the user is primarily authoring and generating content for publication either in physical or online media formats. Referring to FIG. 3 there is presented an image scaling flow according to the prior art of S-H Lee in US Patent Application 2008/0,019,439 entitled "Apparatus and Method for Low Distortion Display in a Portable Communication Terminal". As shown in first step 300A an image 310 has been received by a portable device, not shown for clarity, for display that requires resizing. Accordingly the process of Lee divides the image 310 in second step 300B to a plurality of image segments 321 through 327 in preparation for applying the transformation to each image segment 321 through 327. In third step 300C a linear or non-linear scaling is applied to each image segment 321 through 327 thereby generating scaled image segments 331 through 337. The scaling applied to each of image segment 321 through 327 to generate scaled image segments 331 through 337 being different such that the content is scaled to an increased percentage of the image to be displayed to the user but is done so in a manner that is supposed to reduce perceived distortion.

However, Lee applies a predetermined scaling according to a mathematical function, for example a cosine function, such that weighting in the scaled image is given to the central portion of the content which is expanded and the outer portions are reduced when the overall image is to be reduced dimensionally. Whilst other mathematical functions may be employed such as a sine, hyperbolic tangent, sinc etc for example the appropriate mathematical function should be determined by the content of the image which requires in an automatic scaling application, that the image be first processed to determine the distribution of content and hence appropriate function to apply. Equally, Lee only teaches applying the function in one dimension whereas it would be beneficial to provide the methodology in two dimensions when considering the target portable devices etc. Other examples within the prior art include P. O. Vale in U.S. Pat. No. 7,385,615 entitled "System and Method for Scaling Images to Fit a Screen on a Mobile Device According to a Non-Linear Scale Factor".

A further alternative is taught by H. Chao et al in US Patent Application 2008/0,095,470 entitled "Digital Image Auto-Resizing" and shown schematically in FIG. 4 as applied to an initial image 410. As shown Chao teaches that the image is broken into two portions, a first portion 420 where the content will be scaled at a first scaling factor, and a second portion 440 which will be scaled at a second scaling factor.

Accordingly first portion 420 is broken into four elements, first to fourth elements 421 through 424 respectively, which will be scaled to fit the new overall window to present the scaled image 460 but is performed in a manner to reduce the reduction in the portion of the scaled image given to the second portion 440. Hence, first element 421 and fourth element 424 would be scaled only in the horizontal axis whilst second element 422 and third element 423 would be scaled only in the vertical axis. As such the scaled replicas of first to fourth elements 421 through 424 respectively are combined to form scaled first portion 430. The second portion 440 is scaled to generate scaled second portion 450 and is then combined with scaled first portion 440 to generate the scaled image 460 to be presented to the user. Again a drawback of Chao is that selecting the portions of the image, namely first and second portions 420 and 440 respectively, can significantly impact the resultant scaled image 460 and the viewer's perception or satisfaction as a result. Other examples of such blocked scaling of images include K. Berkner et al in U.S. Pat. No. 7,548,654 entitled "Header Based Scaling and Cropping of Images Compressed Using Multi-Scale Transforms" and S J. Kaasila et al in U.S. Pat. No. 7,287,220 entitled "Methods and Systems for Displaying Media in a Scaled Manner and/or Orientation".

Extensions of such cutting, scaling and re-pasting include those reported by V. Setlur et al in "Automatic Image Re-Targeting" (Proc. 18th ACM Symposium on User Interface Software and Technology, pp. 153-162, 2005), J. Jia et al in "Drag-and-Drop Pasting" (Proc. SIGRAPH 2006, Vol. 25, No. 3, pp. 631-637 July 2006), J. Wang et al in "Simultaneous Matting and Compositing" (Microsoft Technical Report MSR-TR-2006-63, May 2006), C. Jacobs et al in "Adaptive Grid-Based Document Layout" (Proc. ACM SIGGRAPH, pp. 838-847, 2003), W. T. Freeman et al in U.S. Pat. No. 6,919,903 entitled "Texture Synthesis and Transfer for Pixel Images", and I. Clarke et al in US Patent Application 2006/0,072,853 entitled "Method and Apparatus for Resizing Images."

A further extension of this approach within the prior art was described by B. S. Hallberg et al in U.S. Pat. No. 6,563,964 entitled "Image Down-Sampling Using Redundant Pixel Removal" wherein the image to be reduced in size was non-uniformly down-sampled to remove aliasing within the high spatial frequency information content such that low spatial frequency information content is preferentially removed. This required that the image be processed by a spatial frequency estimator that compared groups of pixels in order to produce a classification of the image. Subsequently a path generator and path scorer analyze potential deletion paths within the image and the path with highest score, the one giving minimal distortion and aliasing, is selected for pixel removal. This process being repeated until a desired number of image rows and/or columns have been removed. As such Hallberg teaches that the entire image is arbitrarily analyzed rather than the preceding prior art wherein sampling of the image for determination of scaling was predetermined by applying a mask, template or mathematical function. However, Hallberg as noted only addresses reduction and is primarily focused to the problem of reducing the display of textual based information such as directory listings etc in applications such as Windows Explorer as the display type varied rather than arbitrary window generation as users adjust web browser pages etc.

The approach of Hallberg was extended by S. Aviden et al as reported in U.S. Pat. No. 7,477,800 entitled "Method for Re-Targeting Images" and their publication "Seam Carving for Content Aware Image Resizing" (ACM Transactions on Graphics SIGGRAPH 2007, Volume 26, Number 3, Article 10, July 2007). Aviden coined the term "seam carving" to refer to a simple image operator that provides adjustment of an image's size by carving-out or inserting pixels in different parts of the image. The determination of "seams" to carve or insert being made in respect of an energy function that defines the importance of pixels. A "seam" being defined by a connected path of low energy pixels crossing the image from one side to another representing the minimum energy path across the image. Removal of these "seams" providing for reduction in the image dimension in horizontal and/or vertical dimensions whilst insertion of these "seams" providing for expansion of the image. Aviden states that the image operator produces, in effect, a content-aware resizing of the image.

Additional extensions of this work have been reported by M Klingemann (see flash blog http://www.quasimondo.com/archives/000652.php of September 2007) using an energy function generated through convolving the image with a blurred offset version of itself, the offset being a few pixels. H. Welles has also published open source implementations of the "seam carving" method of Aviden (see Ariadne and Seamstress algorithms at http://seam-carver.sourceforge.net).

Aviden teaches that the digital image to be dimensionally adjusted is initially converted into a so-called "energy map" wherein every pixel in the image is mapped to a pixel within the "energy map," Subsequently the cumulative energy for a continuous I-pixel wide "seam" is calculated from one side of the image to the other side. The two preferred energy functions taught are outlined below in Equations 1 and 2. Aviden teaches that no single energy function works well across all images but that most have similar ranges of resizing before visual artifacts are introduced.

$$e_1(I(x, y)) = \left|\frac{\delta}{\delta x}I(x, y)\right| + \left|\frac{\delta}{\delta y}I(x, y)\right| \qquad (1)$$

$$e_{HoG}(I(x, y)) = \frac{\left|\frac{\delta}{\delta x}I(x, y)\right| + \left|\frac{\delta}{\delta y}I(x, y)\right|}{\max(HoG(I(x, y)))} \qquad (2)$$

where I(x, y) is a particular pixel, and HoG (I(x, y)) is taken to be a histogram of orientated gradients at every pixel (see N. Dalal et al "Histograms of Orientated Gradients for Human Detection" Intl. Conf. Computer Vision and Pattern Recognition, Vol. 2, pp 886-893). Aviden teaches using an 8-bin histogram computed over an 11×11 window around a pixel for HoG(I(x, y)).

Referring to FIG. 5 the method of A divan is presented using images taken from the publication "Seam Carving for Content Aware Image Resizing" (ACM Transactions on Graphics SIGGRAPH 2007, Volume 26, Number 3, Article 10, July 2007). A source image 510 is shown, and the intention is to change the aspect ratio from say 4:3 to 16:9. Applying a conventional linear scaling to source image 510 results in linear image 520. Applying the method of "seam carving" of Aviden begins with the generation of the "energy map" 530 from source image 510. From this single "energy map" a horizontal seam map 540 is generated together with vertical seam map 550 that define the cost of removing a seam in each direction. Based upon the determination to remove either a horizontal and/or vertical seam a carved image 560 is generated. If the carved image 560 is not at the target image size then the process cycles back to recalculate the energy map 530 and repeats until the final image dimension is achieved.

Aviden teaches that resizing an image from 240×320 pixels to 128×160 pixels, such as reflects an image shifted from the inner display of a Blackberry Pearl Flip cellular telephone to it's outer display, would be achieved by removing 112 vertical 'seams' and 160 horizontal "seams". Removal of each seam requires that the "energy map" is recalculated to determine which "seam" is to be removed next. Accordingly the removal of the 112 vertical and 160 horizontal "seams" requires the generation of 272 "energy maps" which is computationally intense, particularly so if Equation (2) was employed. As such Aviden teaches that a designer may author a multi-size image once and a client application depending upon the image size needed performs the requisite number of "seam" removals or additions such that the resizing can occur quickly in real time to fit the layout or display. The authoring being the computationally intense generation of the large number of "energy maps" and processing of the "seam" determinations to generate the multiple image sizes. The information relating to the multiple image sizes would for example be stored as a header within the image file. Such an approach of header encoding being taught, albeit not in relation "seam carving" for example by K. Berkner in U.S. Pat. No. 7,548, 654 as outlined supra.

However, a user accessing the Internet and retrieving images is not going to only access images generated by publishers with desktop publishing software that included the "seam carving" information for multiple images embedded within. Further such an approach also affects even the retrieval of audiovisual content by increasing the file size. As of mid-2009 the indexable web contained at least 22 billion pages (http://www.worldwidewebsize.com) hosted on over 110 million websites (http://www.domaintools.com/internet-statistics). Simply searching using Google for images with "photo" returns over 700 million results whilst popular social networking websites such as Facebook are reported at peak times to have 300,000 images uploaded a second by registered members. It would be evident that even if "seam carving" was introduced into all image generating devices, such as desktop publishing software, digital cameras, cellular telephones etc, by virtue of being embedded as part of an international standard such as Portable Network Graphics (PNG), Tagged Image File Format (TIFF), and Motion Pictures Expert Group (MPEG) for example, that it would take a significant period of time to become the dominant format for digital audiovisual content accessible to Internet users.

Accordingly it would be beneficial to provide a method of resizing digital images that was independent of their method of generation, i.e. portable consumer electronics or desktop software, independent of the platform upon which the images were to be displayed, i.e. low cost consumer portable devices or laptop computers, the display they are to be displayed upon, i.e. 128×160 pixel 1.8" cellular telephone display, 1600×900 pixel 17.3" laptop, user activity such as flipping the Apple iPhone from a 320×480 pixel portrait orientation to 480×320 pixel landscape orientation in a fraction of a second, and the source image format.

It would be further beneficial if the method of resizing was also content aware, i.e. provided scaling that did not remove significant image elements or distort images at typical resizing factors unless expressly permitted by the user. Such permission being provided within desktop publishing or image manipulation software such as Abode Photo shop, Corel Paint Shop Pro, Ulead Photo Impact for example. It would be further beneficial if the method permitted the protection of content during resizing or explicitly weighted content for removal during resizing or editing, was fast, and easily incorporated into the firmware of devices as well as desktop publishing software.

SUMMARY OF THE INVENTION

It is an object of the present invention to obviate or mitigate at least one disadvantage of the prior art.

In accordance with an embodiment of the invention there is provided a computer implementable method comprising the steps of generating at least one saliency map of a plurality of saliency maps, the at least one saliency map characterized by at least a number of pixels equal to a number of pixels within a source audiovisual content and each pixel within the at least one saliency map having a value associated with it which is determined in dependence upon determining at least a saliency for the corresponding pixel within the source audiovisual content, and generating at least one reduced saliency map of a plurality of reduced saliency maps, each reduced saliency map associated with a saliency map and generated by applying at least one predetermined scaling factor to the at least one saliency map. The method further comprising the steps of applying a path determination process to the at least one reduced saliency map, the path determination process for identifying a sequence of pixels within the at least one reduced saliency map that meet a predetermined condition, and modifying the source audiovisual content in dependence upon at least the sequence of pixels.

In accordance with another embodiment of the invention there is provided a computer implementable method comprising the steps of generating a saliency map characterized by at least a number of pixels equal to a number of pixels within a source audiovisual content and each pixel within the saliency map having at least two values associated with it, one value determined in dependence upon at least a saliency for the corresponding pixel within the source audiovisual content along a first axis of the image and the other value determined in dependence upon at least a saliency for the corresponding pixel within the source audiovisual content along a second axis of the image and generating a reduced saliency map by applying at least one predetermined scaling factor to the saliency map, each pixel with the reduced saliency map having at least first data generated in dependence upon at least the one value of a pixel within the saliency map associated with the pixel in the saliency reduced map and second data generated in dependence upon at least the other value of a pixel within the saliency map associated with the pixel in the saliency reduced map. The method further comprising the steps of applying a path determination process to at least one of the first data and the second data within the reduced saliency map, the path determination process for identifying a sequence of pixels within the reduced saliency map that meet a predetermined condition, and modifying the source audiovisual content in dependence upon at least the sequence of pixels.

In accordance with another embodiment of the invention there is provided a device comprising:

(a) an interface for receiving audiovisual content for presentation to a user upon a display forming a predetermined portion of the device, the audiovisual content characterized by at least a source dimension being at least one of a physical dimension and a number of pixels; and (b) a circuit including at least a processor and a memory for executing a series of processes, the processes including at least:

(i) a display process for determining a target dimension for the audiovisual content for presentation to the user; and (ii) an image process for generating a modified image in dependence upon at least the audiovisual content, the target dimension, and the at least a source dimension, the image process comprising the steps of:

(1) generating a saliency map characterized by at least a number of pixels equal to a number of pixels within the source audiovisual content and each pixel within the saliency map having at least two values associated with it, one value determined in dependence upon at least a saliency for the corresponding pixel within the source audiovisual content along a first axis of the image and the other value determined in dependence upon at least a saliency for the corresponding pixel within the source audiovisual content along a second axis of the image;

(2) generating a reduced saliency map by applying at least one predetermined scaling factor to the saliency map, each pixel with the reduced saliency map having at least first data generated in dependence upon at least the one value of a pixel within the saliency map associated with the pixel in the saliency reduced map and second data generated in dependence upon at least the other value of a pixel within the saliency map associated with the pixel in the saliency reduced map;

(3) applying a path determination process to at least one of the first data and the second data within the reduced saliency map, the path determination process for identifying a sequence of pixels within the reduced saliency map that meet a predetermined condition; and (4) modifying the audiovisual content in dependence upon at least the sequence of pixels to generate display audiovisual content.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to content aware resizing of audiovisual and image content.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Reference below is made in respect of FIGS. 6 through 14 and FIGS. 16 through 18 to an authoring environment in respect to the discussion, such as for example a desktop publishing environment. The scope of the present invention should not be considered as limited by these implementation details, as one skilled in the art will appreciate, which can be modified such that embodiments of the invention may operate with or without user intervention or may be employed in display and presentation environments to a user, such as described in FIG. 15.

Figure 15:
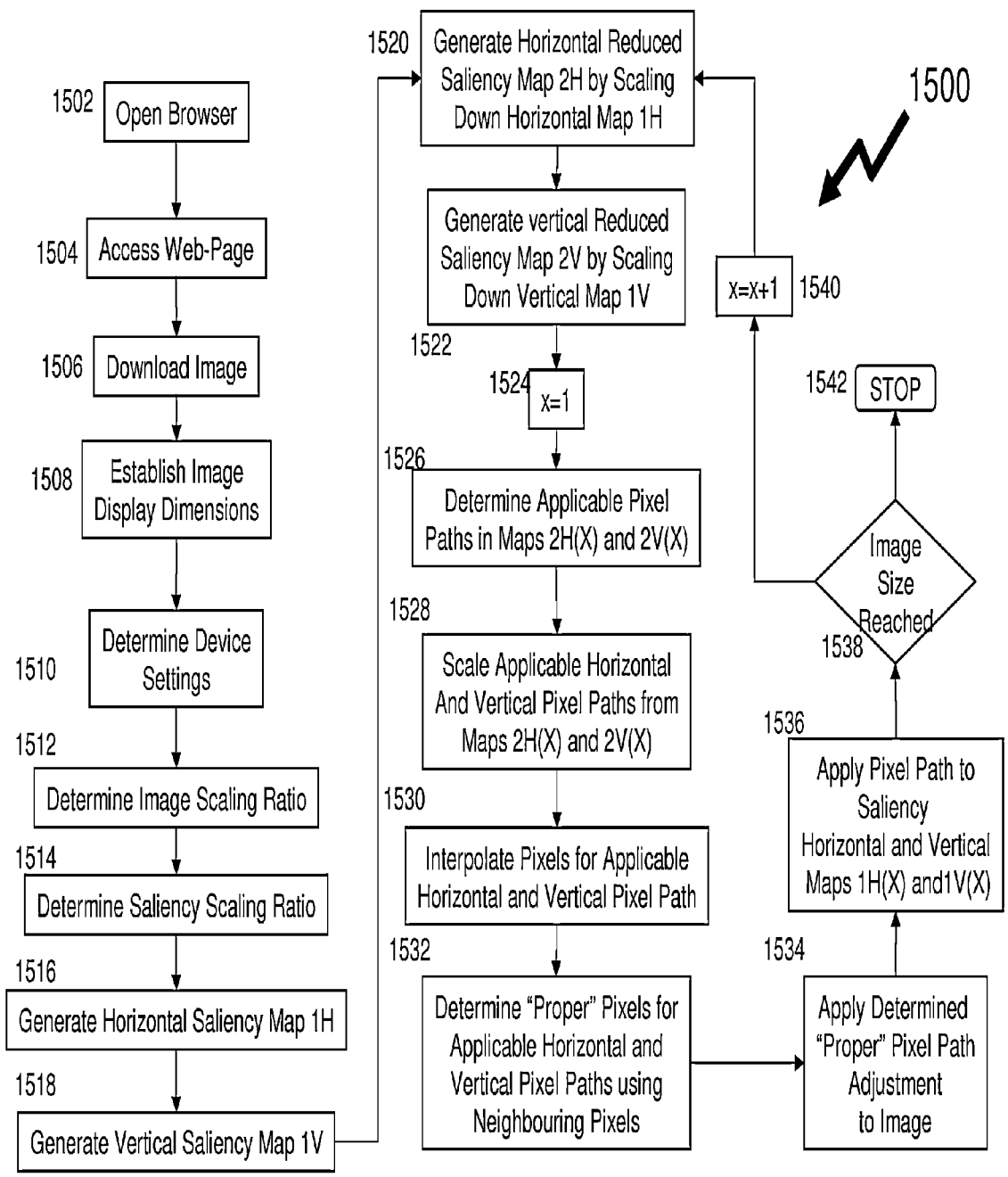
FIG. 15 depicts a process flow according to an embodiment of the invention wherein pixel path determination is executed upon a portable device in dependence upon characteristics of the portable device.

Further in FIG. 15 reference is made to a portable device in the determination of the parameters in establishing aspects of the resizing operation which extend beyond the intended image size. The scope of the present invention should not be considered as limited by these application details, as one skilled in the art will appreciate, which can be varied according to the particular portable device but also apply to the wider range of devices upon which user activities may require content aware image resizing.

Within the background to the invention discussed supra descriptions of FIGS. 1 through 5 have been included and are not repeated here.

Figure 1:
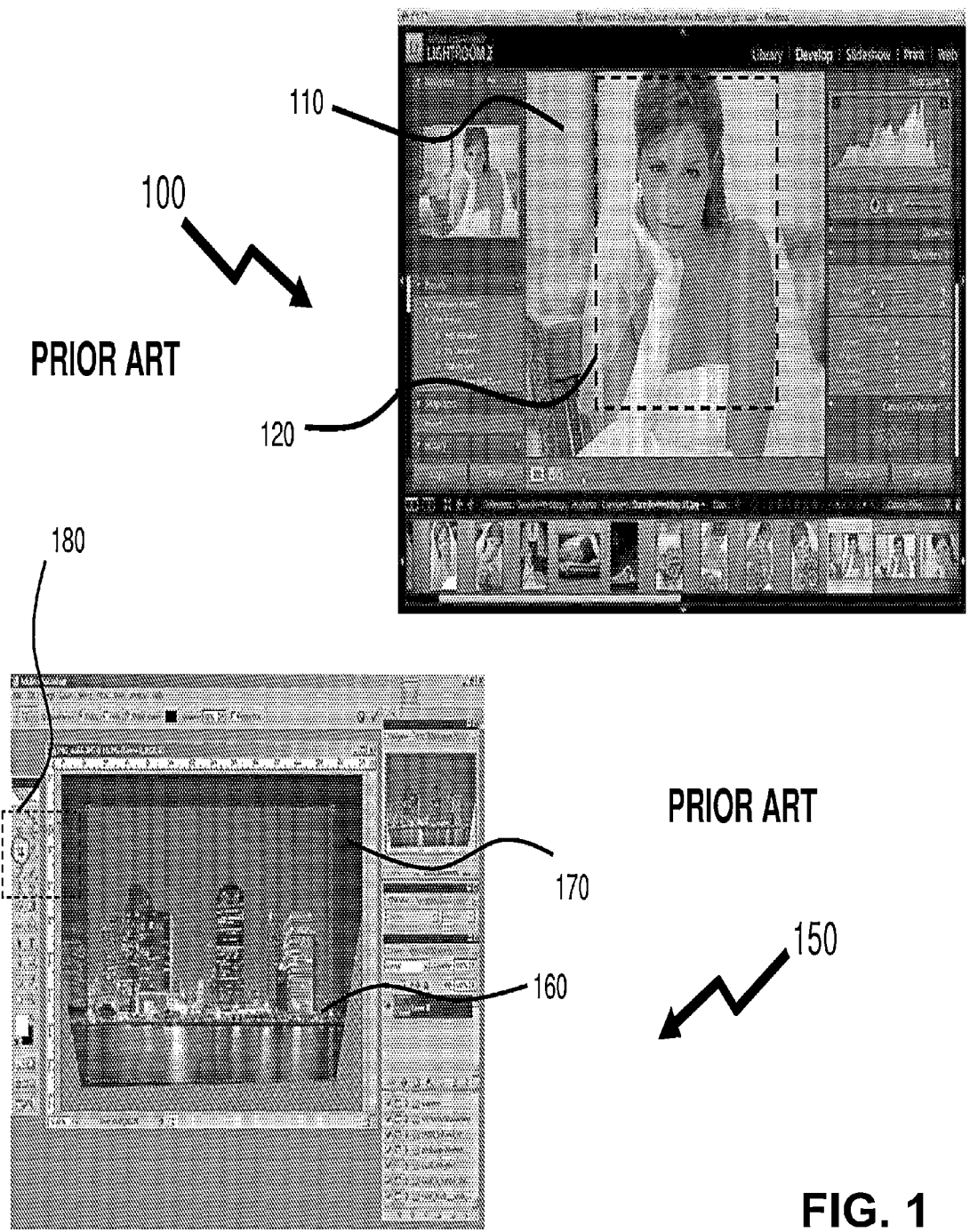
FIG. 1 is a representation of the prior art wherein software provides image resizing through cropping.
Figure 2:
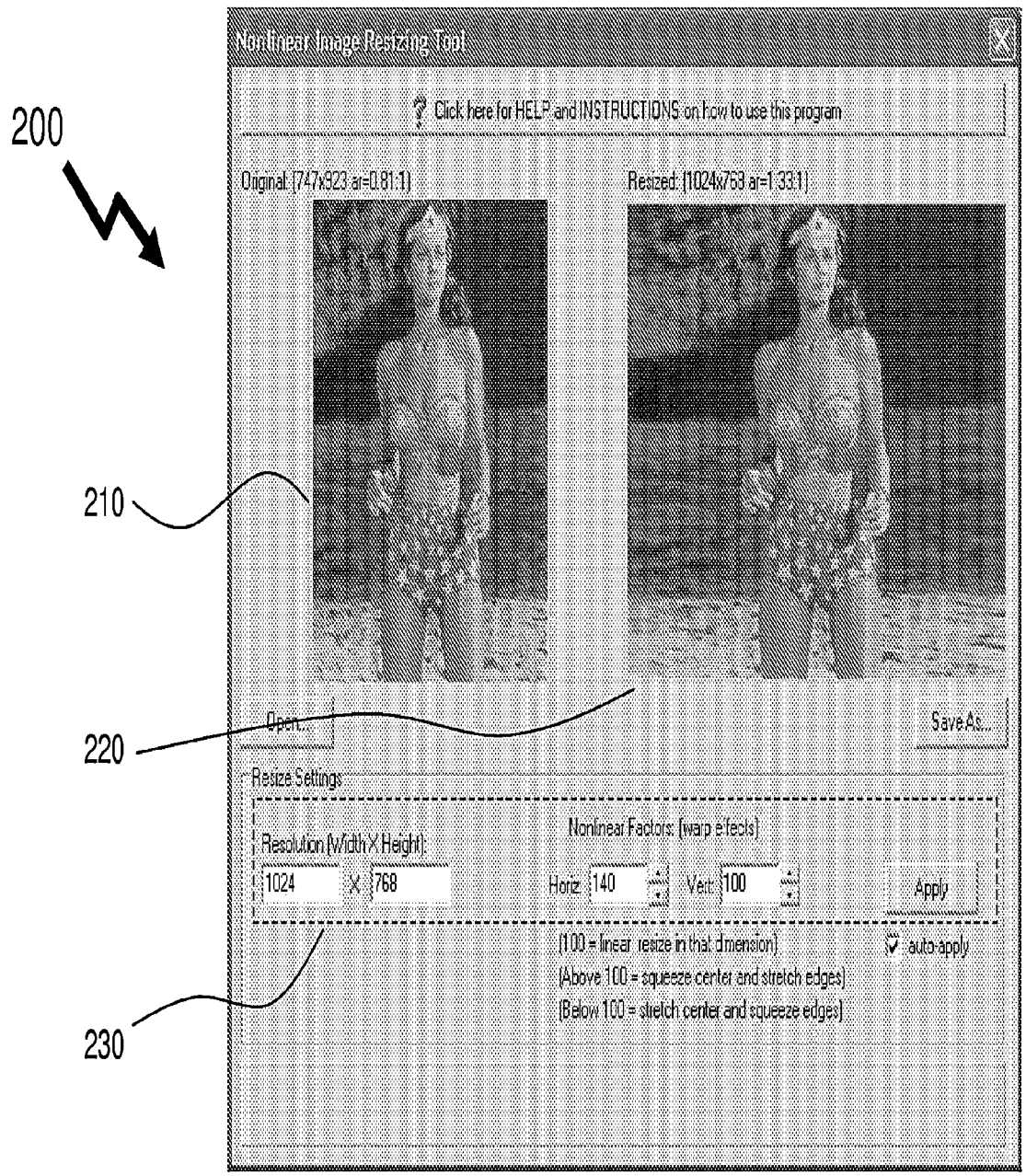
FIG. 2 is a representation of the prior art where image resizing is based upon a non-linear scaling.
Figure 3:
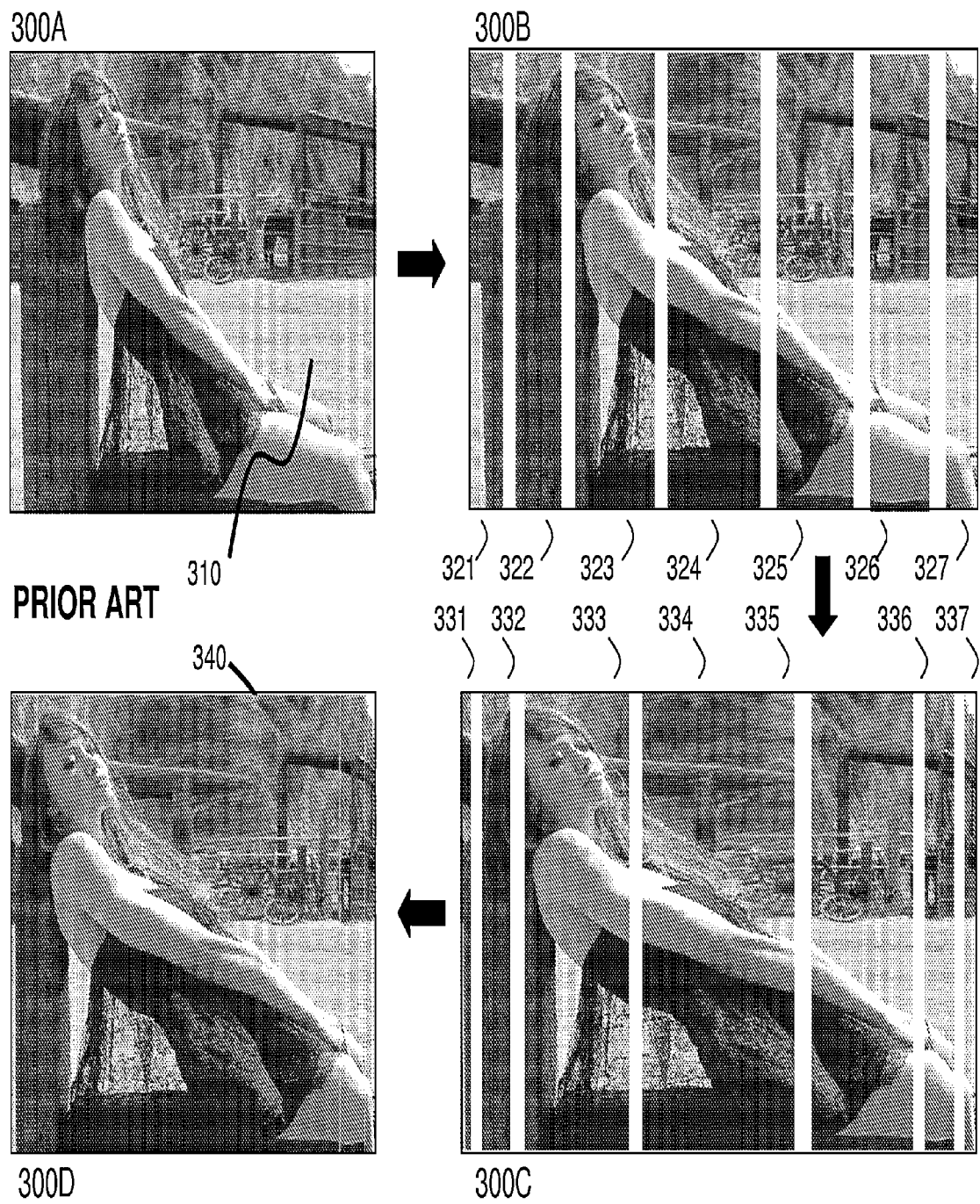
FIG. 3 depicts image resizing according to the prior art of S-H Lee in US Patent application 2008/0,019,439.
Figure 4:
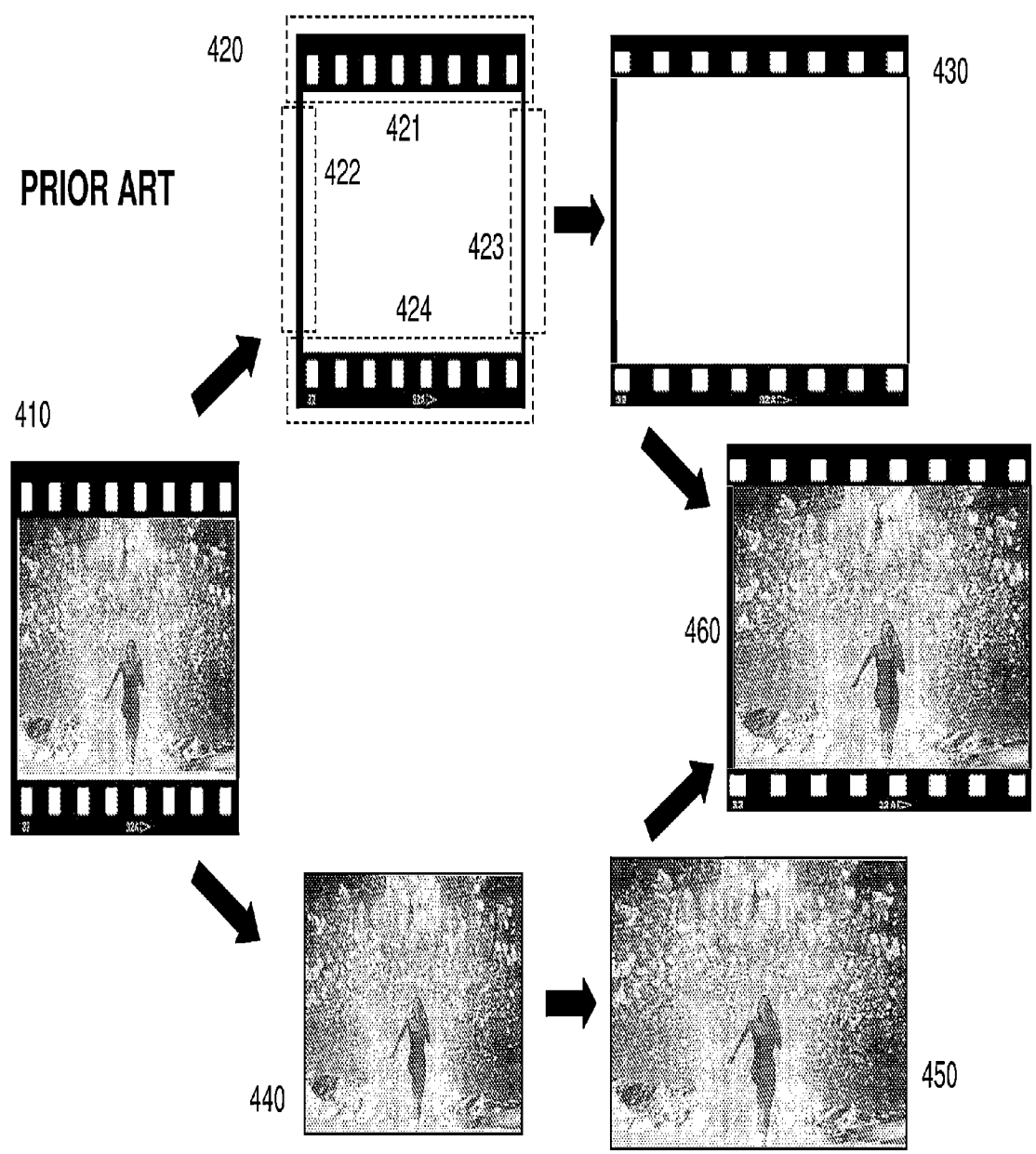
FIG. 4 depicts image resizing according to the prior art of H. Chao in US Patent application 2008/0,095,470.
Figure 5:
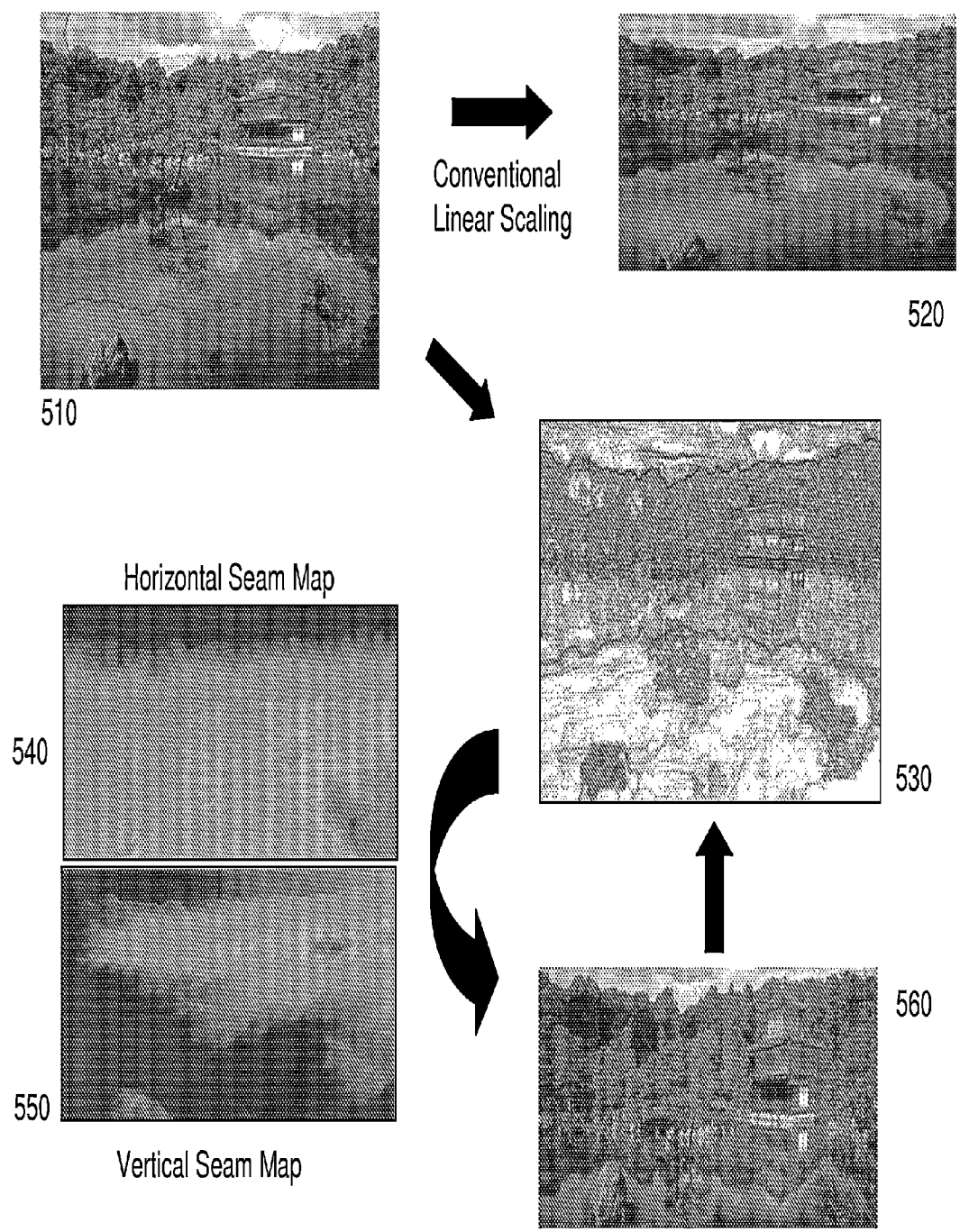
FIG. 5 depicts content aware image resizing according to the prior art of S. Aviden in U.S. Pat. No. 7,477,800.
Figure 6:
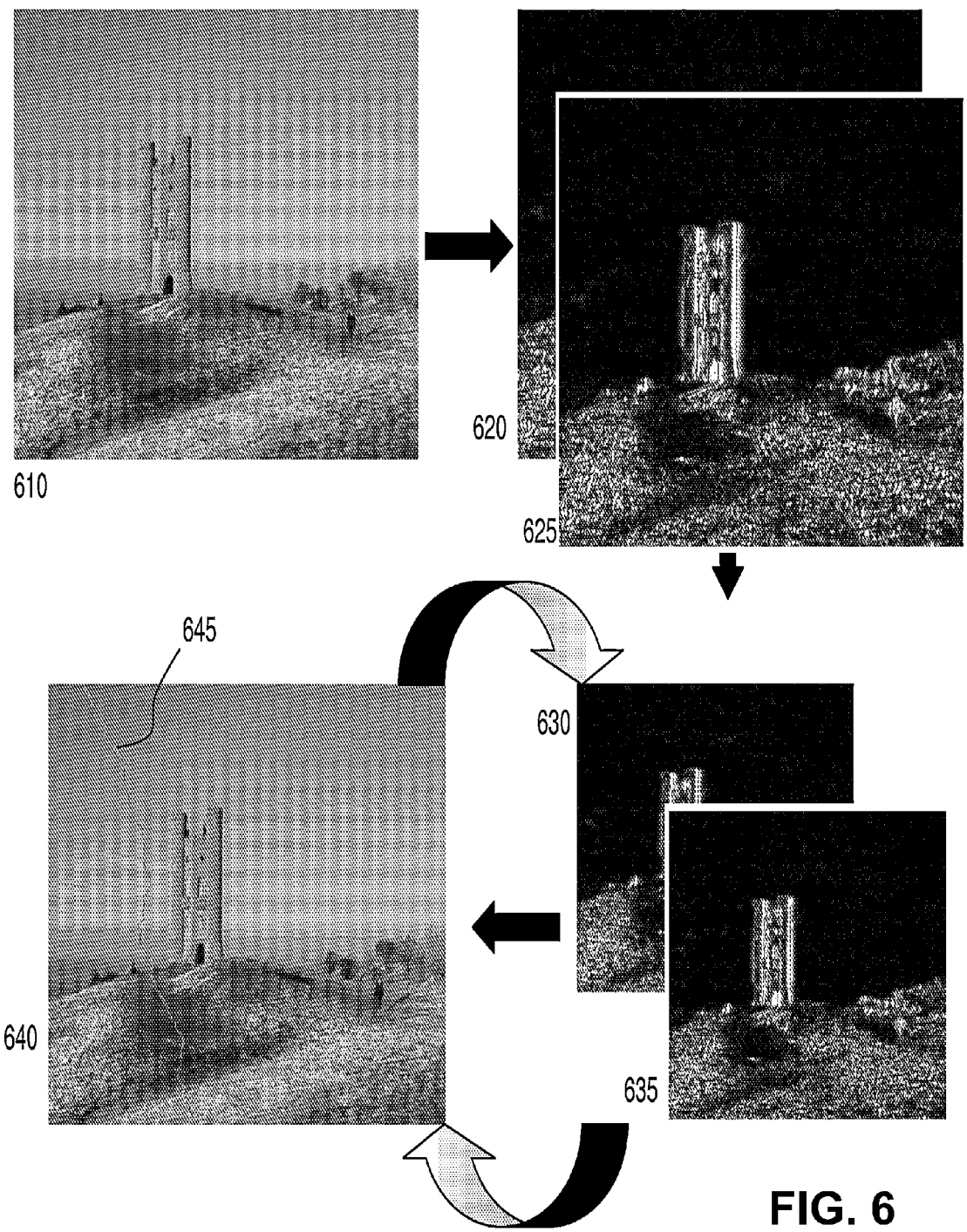
FIG. 6 depicts an embodiment of the invention depicting generation of the first gradient maps and associated reduced second gradient maps with their reuse in repeated removal of selected pixel paths to resize an image.

Referring to FIG. 6 there is depicted an exemplary flow according to an embodiment of the invention. As shown a source image 610 is provided for which a resizing operation is required within an authoring environment, the authoring environment omitted for clarity. The content aware resizing process then generates first horizontal saliency map 620 and first vertical saliency map 625 which represent the horizontal and vertical saliencies within the image which are determined from Equations 3 and 4 below:

$$\text{Saliency}_{horizontal}(n_{i,j}) = |I(n_{i,j+1})| - |I(n_{i,j-1})| \qquad (3)$$

$$\text{Saliency}_{vertical}(n_{i,j}) = |I(n_{i+1,j})| - |I(n_{i-1,j})| \qquad (4)$$

where $I(n_{i,j})$ is the intensity of the $i^{th}$, $j^{th}$ pixel in the image.

Each of the first horizontal saliency map 620 and first vertical saliency map 625 are then scaled to generate second reduced horizontal saliency map 630 and second reduced vertical saliency map 635. These are then employed to generate the cost functions for removing a pixel seam in each of the horizontal and vertical directions. A selected vertical seam from second reduced horizontal saliency 630 is shown as pixel path 645 projected onto resizing image 640. Removal of the pixels identified by pixel path 645 would reduce the horizontal dimension of the source image 610. Alternatively insertion of replica pixels identified by pixel path 645 would increase the horizontal dimension. Accordingly the source image 610 is scaled based upon a pixel path that is determined through the scaling transformation in respect of the horizontal and vertical saliencies defined in Equations (3) and (4) supra.

Figure 7A:
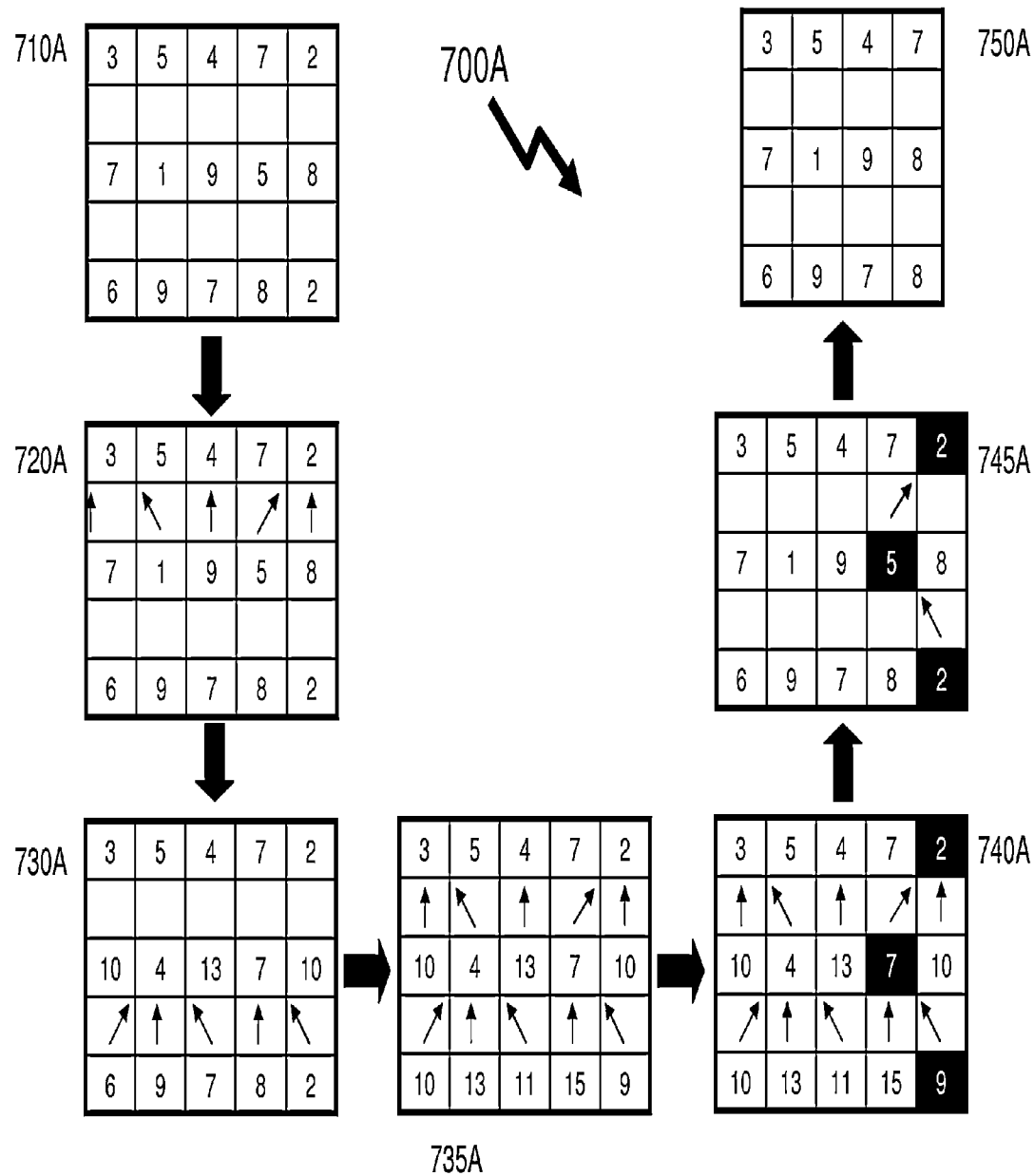
FIG. 7A depicts an embodiment of the invention in establishing a pixel path within a gradient map.

Referring to FIG. 7A there is depicted a process flow 700A according to an embodiment of the invention in establishing a pixel path within a reduced saliency map. The process starts with first pixel map 710A of dimension 5×3, which represents a subset of a reduced saliency map such as second reduced horizontal saliency map 630 or second reduced vertical saliency map 635 in FIG. 6 supra. The process then determines the interconnected paths between the pixels on the first row and the second that are connected, resulting in second pixel map 720A which shows this connectivity between the first row and second row such that the process then sums these paths giving the middle summation in third pixel map 730A together with the mapping of connectivity between the summed second row and third row. The resultant summation being shown in fourth pixel map 735A along with the connectivity paths from each row to the next. According to an embodiment of the invention process flow 700A is set to detect the minimum summation in the pixel path and thereby determines this is in the summed path provided in fifth pixel map 740A. Accordingly the pixels within the subset of the saliency map are selected as depicted by sixth pixel map 745A. In the final step the process removes these pixels thereby generating seventh pixel map 750A which is now of dimension 4×3. In the process according to the embodiment of the invention this pixel removal in the reduced saliency map follows removal of pixels within the audiovisual content, such as described below in respect of FIG. 15.

It would evident to one skilled in the art that process flow 700A does not take into account the pixels removed from the saliency map such as is evident in the comparison of sixth and seventh pixel maps 745A and 750A respectively where simply the pixel path selected has been removed. In other embodiments of the invention, for instance where a portion of the saliency map has a localized reduction in saliency compared with the overall saliency map the reduction algorithm may perform some form of compensation such as shown below in Table 1. As shown on the left is seventh pixel map 750A according to process flow 700 in FIG. 7. On the right is a compensated pixel map representing the same pixel path removal but where now pixels adjacent the removed pixel are re-calculated according to Equations 5A and 5B below:

$$S^{k+1}(i-1,j) = S^k(i-1,j) + S^k(i,j)/2 \qquad (5A)$$

$$S^{k+1}(i-1,j) = S^k(i+1,j) + S^k(i,j)/2 \qquad (5B)$$

where $S^k(i,j)$ represents the saliency value at the $i^{th}$, $j^{th}$ pixel for step k in the image resizing process. It would be apparent that similar equations as Equations 5A and 5B exist for removing a horizontal pixel path. Such a compensated pixel map locally increases saliency above the initially calculated values upon removal of a pixel path which would weight a subsequent pixel path determination away from the same region of the saliency map such that multiple pixel path determinations do not always run through the same portion of the saliency map and hence the original image.

TABLE 1

Left: Saliency map after pixel path removal according to process 700 of FIG. 7A Right: Saliency map after pixel path removal with compensation as discussed supra

| 3 | 5 | 4 | 7 | 3 | 5 | 4 | 8 |
| 7 | 1 | 9 | 8 | 7 | 1 | 11.5 | 10.5 |
| 6 | 9 | 7 | 8 | 6 | 9 | 7 | 9 |

It would be evident to one of skill in the art that the selected path within process 700A by virtue of having the lowest summation of saliencies represents a path of pixels that have low difference in intensity to their neighbouring pixels in a particular direction. These pixels are not necessarily at a minimum within the reduced saliency map for the other direction and hence not necessarily the same pixels as would be selected in the process of A vidan when employed on the same image. As such removing these pixels from the image should not significantly affect the content for the user whilst allowing the image dimension to be reduced. It would evident to one skilled in the art that zero saliency or very low saliencies may reflect areas of consistent intensity rather than lack of content. As such regions where saliencies exceed a predetermined threshold may be subjected to a second process to determine whether they are simply pixels reflecting low intensity variations and hence sacrificial content or significant content of consistent intensity. For example the second process may be to calculate and compare a second saliency for a particular pixel, see for example Equations 5C and 5D below; with the first saliency such that upon a precondition being met the calculated saliency is replaced with a predetermined value.

$$\text{Saliency2}_{horizontal}(n_{i,j}) = |I(n_{i,j+n})| - |I(n_{i,j-n})| \qquad (5C)$$

$$\text{Saliency2}_{horizontal}(n_{i,j}) = dI(i,j)/dj \qquad (5D)$$

Figure 7B:
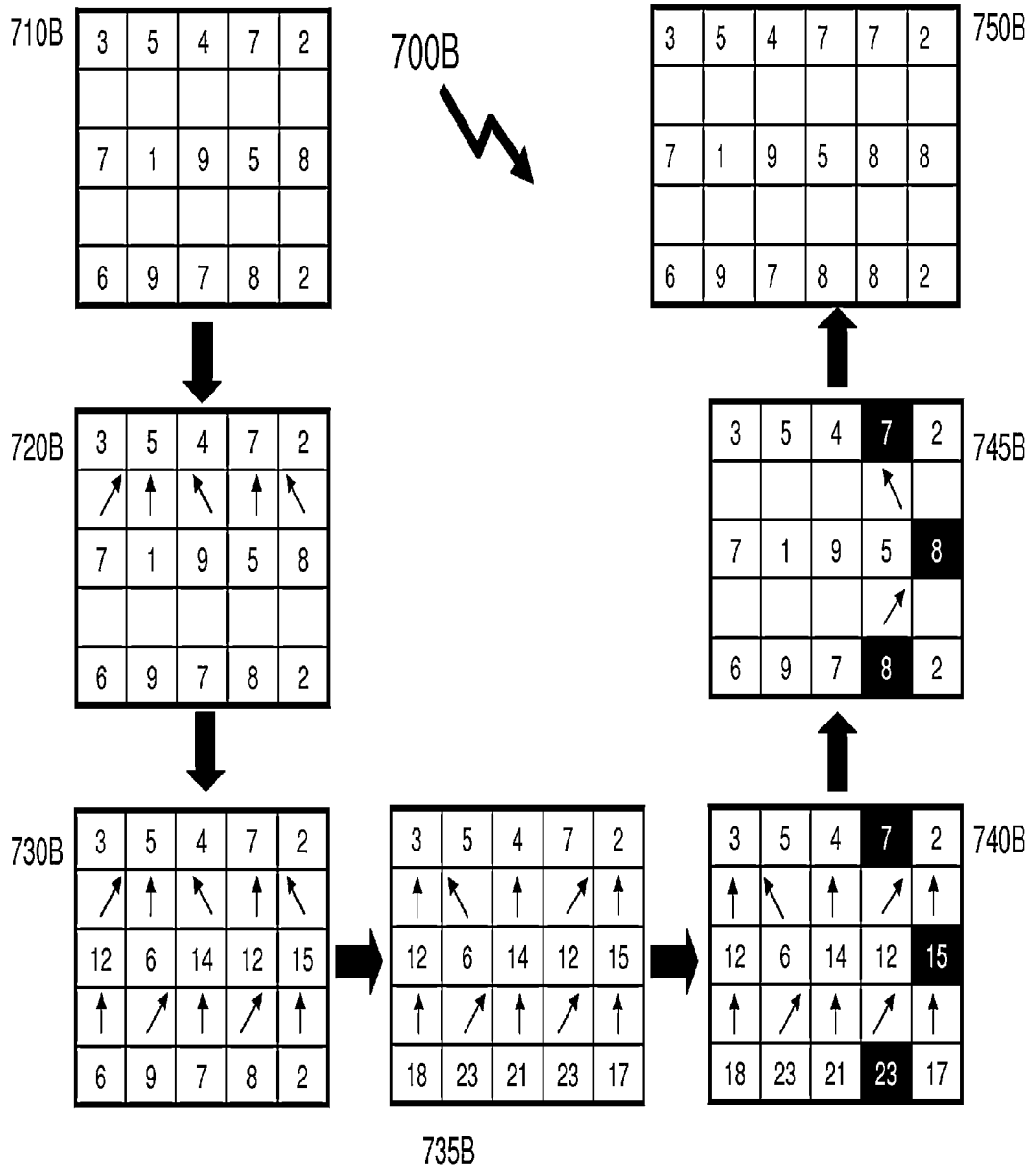
FIG. 7B depicts an embodiment of the invention in establishing a pixel path within a gradient map.

Referring to FIG. 7B there is depicted a process flow 700B according to an embodiment of the invention in establishing a pixel path within a reduced saliency map. The process starts with first pixel map 710B of dimension 5×3, which represents a subset of a reduced saliency map such as second reduced horizontal saliency map 630 or second reduced vertical saliency map 635 in FIG. 6 supra. The process then determines the interconnected paths between the pixels on the first row and the second that are connected, resulting in second pixel map 720B which shows this connectivity between the first row and second row such that the process then sums these paths giving the middle summation in third pixel map 730B together with the mapping of connectivity between the summed second row and third row. The resultant summation path being shown in fourth pixel map 735B along with the connectivity paths from each row to the next. According to an embodiment of the invention process flow 700B is set to detect the maximum summation in the pixel path and thereby determines this is in the summed path provided in fifth pixel map 740B. Accordingly the pixels within the subset of the saliency map are selected as depicted by sixth pixel map 745B. In the final step the process adds these pixels into the first pixel map 710B thereby generating seventh pixel map 750B which is now of dimension 6×3.

It would be evident to one of skill in the art that the selected path within process 700B by virtue of having the highest summation of saliencies represents a path of pixels that have high difference in intensity to their neighbouring pixels. As such replicating those pixels within the image that relate to those within the reduced saliency map should preserve the visually significant content for the user whilst allowing the image dimension to be increased.

It would be apparent to one skilled in the art that the pixel path selection in FIGS. 7A and 7B may be subject to additional constraints or determined on alternative basis. For example it may be a constraint that the pixel path originates within a predetermined distance of the image edge such that the central image content is preserved irrespective of its pixel saliency summation, where the assumption is that most significant content is within the central portion of the image. Alternatively a summation may be performed over predetermined regions of the second saliency map such that regions of higher than average accumulated saliency are identified and preserved. Optionally the pixel path selection when the adjustment is a significant percentage of the original image dimension may be established such that pixel paths should be maximized in one direction and minimized in another. Similarly where pixel path selection has been described as seeking a minimum/maximum the converse of seeking the maximum/minimum for the same image resizing operation exists. Many alternatives exist within the scope of the invention.

Figure 7C:
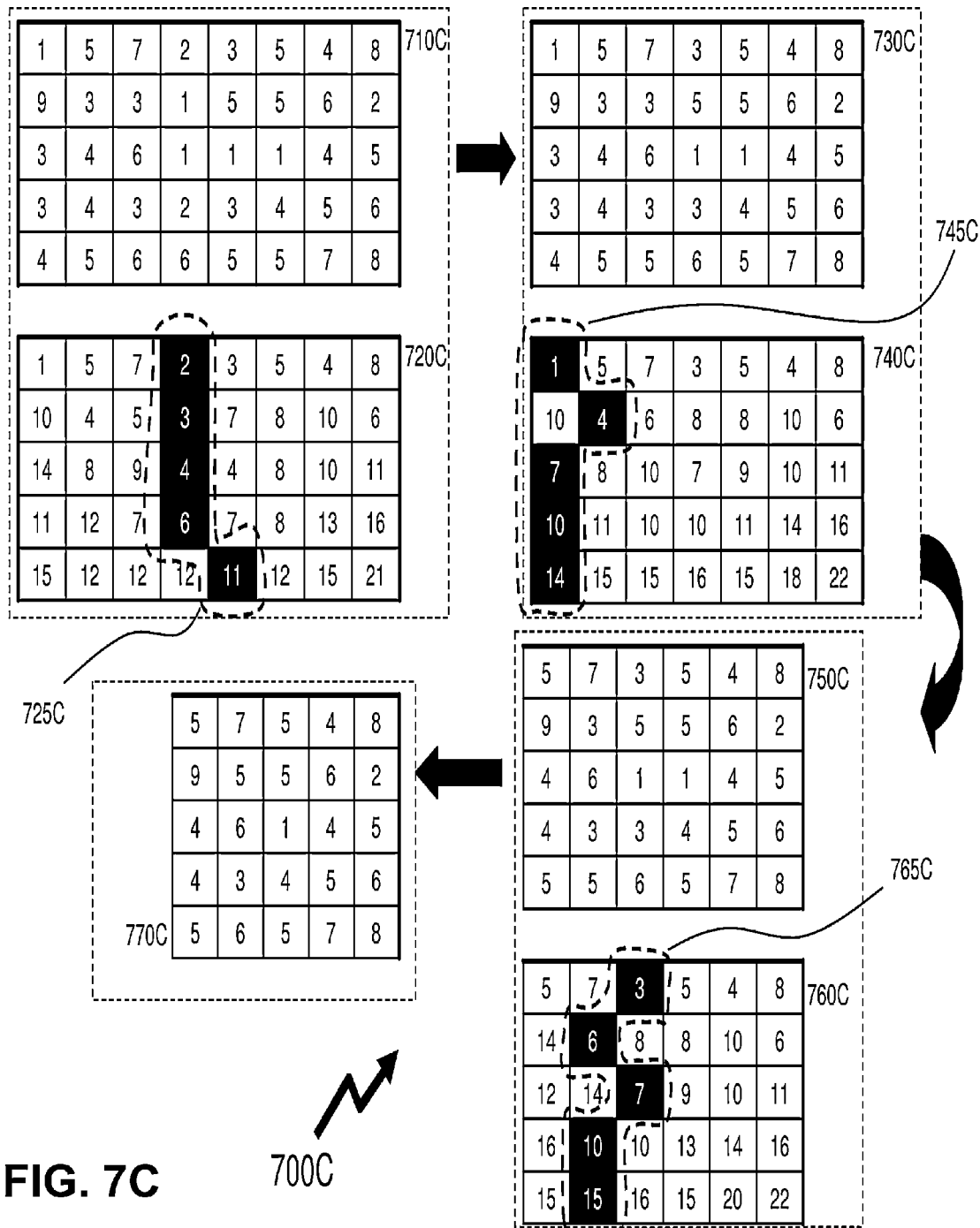
FIG. 7C depicts repeated pixel path determinations made upon the reduced second gradient map according to an embodiment of the invention for reduced processing complexity and improved speed.

Referring to FIG. 7C there is depicted a process flow 700C wherein repeated pixel path determinations are made upon the reduced second saliency map according to an embodiment of the invention for reduced processing complexity and improved speed. As such within process 700C a first reduced saliency map 710C is shown, equivalent for example to first pixel maps 710A and 710B of FIGS. 7A and 7B respectively or predetermined portions of second reduced horizontal saliency map 630 or second reduced vertical saliency map 635 in FIG. 6 supra. First reduced saliency map 710C is a 8×5 array of reduced saliency data, being either the horizontal saliency or vertical saliency of that localized region of the image as reduced saliency map 710C is a reduced dimensional matrix of the corresponding first saliency map, for example first horizontal saliency map 620 or first vertical saliency map 625 as disclosed in FIG. 6. As such a pixel within first reduced saliency map 710C represents N pixels, wherein N represents the scale reduction applied to the corresponding first saliency map. Saliency S(i, j) may alternatively be defined for example by Equations 6 and 7 below rather than by Equations 3 and 4.

$$S(i, j) = \left|I\left(i, j+\frac{N}{2}\right) - I\left(i, j-\frac{N}{2}\right)\right|/N \quad (6)$$

$$S(i, j) = \left|I\left(i+\frac{N}{2}, j\right) - I\left(i-\frac{N}{2}, j\right)\right|/N \quad (7)$$

where I(i, j) represents the intensity of the ith, r pixel in the source image.

In first pixel summation map 720C the summed saliency values S(i, j) from each pixel within the top row to the bottom row are shown for connected paths. Also shown is first pixel path 725C selected from the first pixel summation map 720C, in this case based upon the lowest sum. The pixels within the image content being resized and first reduced saliency map 710C corresponding to the first pixel path 725C are then removed resulting in second reduced saliency map 730C, i.e. pixels S(1,4)=2, S(2,4)=1, S(3,4)=1, S(4,4)=2, and S(5,5)=5 are removed. Corresponding pixels in the image are removed that correspond to the selected pixels in first pixel path 725C thereby reducing the image width based upon its content. Using second reduced saliency map 730C the summation process is repeated and second pixel summation map 740C is generated. Again a pixel path 745C is established such that the corresponding pixels within the second reduced saliency map 730C are removed, i.e. pixels S(1,1)=1,S(2,2)=3,S(3,1)=3,S(4,1)=3, and S(5,1)=4. Again corresponding pixels in the reduced image from the previous removal of pixels are removed, further reducing the width of the image.

Removal of the selected pixels in second reduced saliency map 730C results in third reduced saliency map 750C. As above the process then generates third pixel summation map 760C and selects the next pixel path 765C. Applying the selected path to third reduced saliency map 750C results in fourth reduced saliency map 770C of dimensions 5×5 i.e. removing pixels S(1,3)=3, S(2,2)=3,S(3,3)=1, S(4,2)=3, and S(5,2)=5. As such it would be evident to one skilled in the art that the reduction of the image is accomplished without recalculating the reduced saliency maps from the corresponding horizontal saliency map or vertical saliency map, such as horizontal saliency map 630 and vertical saliency map 640 in FIG. 6. As such scaling the image is achieved with a significant reduction in the processing complexity when compared with the prior art of content aware image resizing, such as S. Aviden et al who recalculate the top level pixel maps from the resultant image after each "seam" is carved or inserted. Such a reduction in processing complexity beneficially provides for the pixel path methodology to be deployed within portable consumer electronics with reduced processing capabilities when compared to laptop PCs with dual-core 2 GHz processors and 4 GB RAM.

Figure 16:
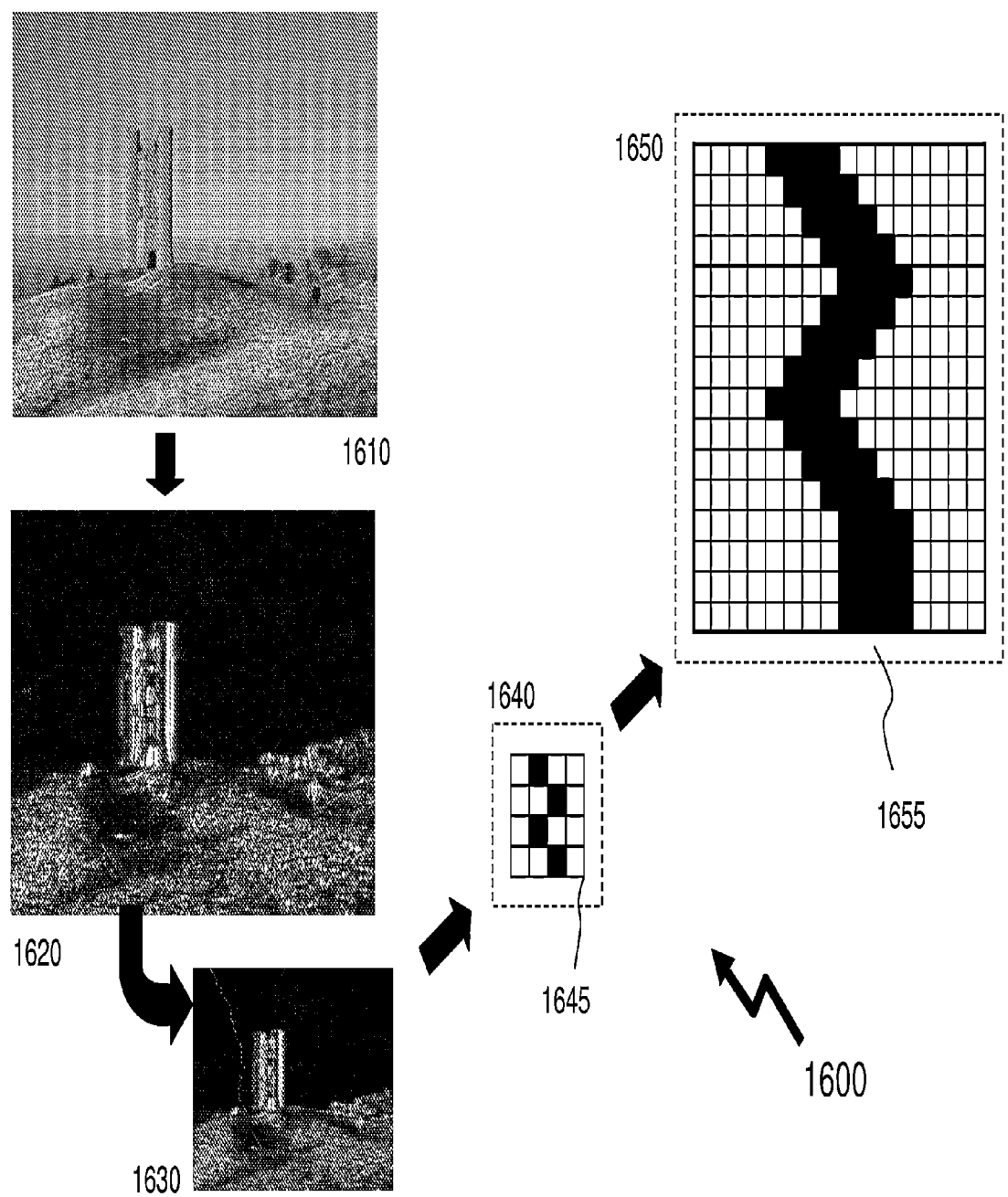
FIG. 16 depicts multiple pixel selection within image resizing according to an embodiment of the invention based upon the reduced second gradient map.

It would be apparent to one of skill in the art that the pixel path adjustment provided within each of the image content and saliency maps as a result of pixel path determination within the reduced saliency map may not always remove the corresponding number of pixels within these higher plane maps, such as described below in FIG. 16. It would be apparent that image resizing may require an increase/decrease in a number of pixels that does not match an integer scaling ratio, i.e. a prime number, which requires either the saliency mapping be performed with a scaling equal to the prime number, not be scaled, or be left at a size not matching the target. Considering simply resizing involving between 1 and 1000 pixels there are 168 prime numbers. For example, removing 367 pixels may be achieved with 367 single pixel path removals which is time consuming but leads to the desired result.

Alternatively as described in embodiments of the invention the scaling provides an increased speed, for example 183 removals of 2 pixel wide paths, 92 removals of 4 pixel wide paths, 61 removals of 6 pixel wide paths, or 37 removals of 10 pixel wide paths. In all cases the final image is at the incorrect final dimension. Accordingly it would be apparent that providing the process with the ability to removal a number of pixels within the image content that does not match the scaling allows the final image to be scaled in a content aware manner to the correct final dimension. Accordingly, 36 removals of 10 pixel wide path with a ÷10 scaling may be followed by a final 7 pixel wide leaves the image at the target resize dimension. Similarly applying 36 removals of 6 pixel wide paths followed by a final single wide pixel path. Accordingly the process may dynamically select a scaling to meet the requirements for speed and processing whilst achieving the final target dimension.

Figure 7D:
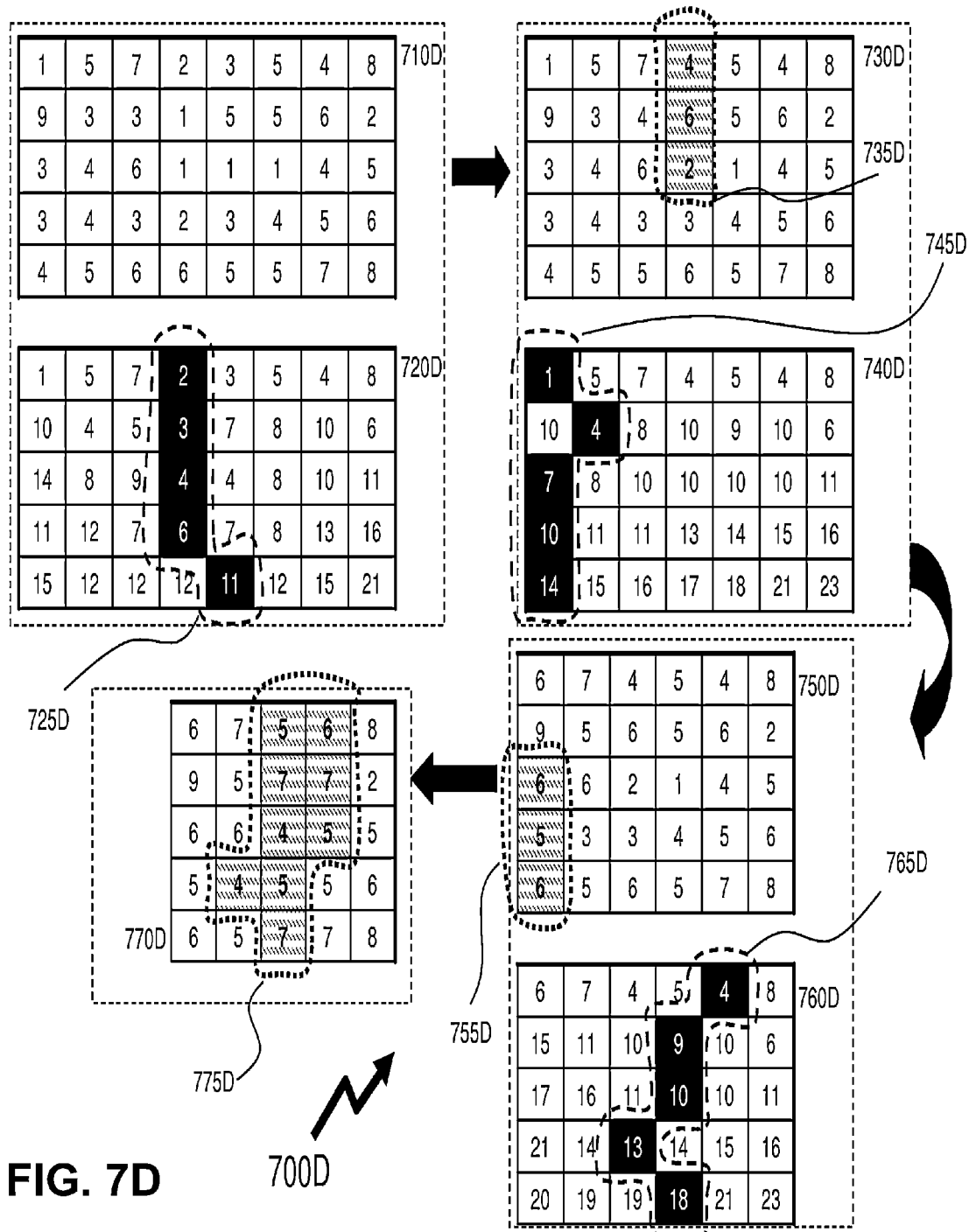
FIG. 7D depicts a process flow wherein repeated pixel path determinations are made upon the second saliency map according to an embodiment of the invention for reduced processing complexity and improved speed.

Referring to FIG. 7D there is depicted a process flow 700D wherein repeated pixel path determinations are made upon the second saliency map according to an embodiment of the invention for reduced processing complexity and improved speed. As such within process 700D a first reduced saliency map 710D is shown, equivalent for example to first pixel maps 710A and 710B of FIGS. 7 A and 7B respectively or predetermined portions of second reduced horizontal saliency map 630 or second reduced vertical saliency map 635 in FIG. 6 supra. First reduced saliency map 710D is a 8×5 array of reduced saliency data, being either the horizontal saliency or vertical saliency of that localized region of the image as reduced saliency map 710C is a reduced dimensional matrix of the corresponding first saliency map, for example first horizontal saliency map 620 or first vertical saliency map 625 as disclosed in FIG. 6. As such a pixel within first reduced saliency map 710D represents effectively N pixels, wherein N represents the scale reduction applied to the corresponding first saliency map.

In first pixel summation map 720D the summed saliency values S(i, j) from each pixel within the top row to the bottom row are shown for connected paths. Also shown is first pixel path 725D selected from the first pixel summation map 720D, in this case based upon the lowest sum. The pixels within the saliency map, not shown for clarity but being that from which first reduced map 710D was derived, corresponding to the first pixel path 725D are then removed. The resulting saliency map, also now shown for clarity, is then reduced to yield second reduced saliency map 730D, of dimensions 7×5, which whilst globally similar to first reduced saliency map 710D as only a portion of the pixels were removed differs in those pixels identified by region 735D, i.e. pixels S(1,4)=4, S(2,4)=6, and S(3,4)=2. As discussed supra the corresponding pixels in the image were also removed in addition to those within the saliency map corresponding to the selected pixels in first pixel path 725D thereby not only reducing the image width but doing so based upon its content. The process flow 700D then uses second reduced saliency map 730D to repeat the summation process from which second pixel summation map 740D is generated. Again a pixel path 745D is established based upon the minimum saliency summation and the process flow 700D then removes corresponding pixels within both the image and saliency map. From this resulting modified saliency map, not shown for clarity process flow 700D calculates the third reduced saliency map 750D.

Third reduced saliency map 750D of dimensions 6×5 is again globally similar to second reduced saliency map 730D, as only a portion of the pixels within the saliency map were removed which forms the source of third reduced saliency map 750D, but differs in region 755D which differs now in S(3,1)=6, S(4,1)=5, and S(5,1)=6. Again process flow 700D performs another summation process resulting in third pixel summation map 760D and selects the next pixel path 765D having lowest saliency summation. Applying this selected path to both the image and saliency map as discussed supra further reduces the image width based upon its content and results in a new saliency map, not shown for clarity, from which a fourth reduced saliency map 770D, now of dimensions 5×5 is generated. As the dimensions of the reduced saliency map reduces the region that differs from the preceding reduced saliency map increases typically. As such, now region 775D now differs in $S(1,3)=5, S(1,4)=6, S(2,3)=7, S(2,4)=7, S(3,3)=4,$
$S(3,4)=5, S(4,2)=4, S(4,3)=5,$ and $G(5,3)=7$ As such it would be evident to one skilled in the art that the reduction of the image is accomplished according to the embodiment of the invention presented in FIG. 7D without recalculating the saliency maps from the corresponding image. However, unlike the preceding embodiment in FIG. 7C the reduced saliency maps are calculated from the applicable horizontal saliency map or vertical saliency map, such as horizontal saliency map 620 and vertical saliency map 625 in FIG. 6, which is reduced during the process. As such scaling the image is achieved with a significant reduction in the processing complexity when compared with the prior art of content aware image resizing, such as S. Aviden et al who recalculate the top level pixel maps from the resultant image after each "seam" is carved or inserted.

Optionally the pixel path selected is based upon multiple conditions. For example, the pixel path selected is not only one meeting a minimum summation or a maximum summation such as presented supra in respect of FIGS. 7 A and 7B but is one where the pixel path is one with a low summation and results in the minimum change in an overall measure of the reduced saliency map for example.

Considering portable devices today with significant market share within their respective markets such as Research in Motion's popular Blackberry 8100, 8300 and 8700 series cellular telephones employing an Intel PXA901 processor at 312 MHz with 16 MB RAM, Nintendo's DSi handheld game console employs two ARM processors, an ARM9E processor operating at 133 MHz and an ARM7TDMI coprocessor operating at 33 MHz, with the ARM9E processor controlling game play and image processing, and Apple's iPod portable audiovisual media players series including the Nano and 40 which employ dual 80 MHz ARM 7TDMI processors. All of these devices support Internet access and hence would benefit from dynamic image processing when browsing the Internet as their capabilities are increased. As such embodiments of the invention support use within portable consumer devices to dynamically resize image with content aware scaling in real-time thereby allowing them to access any published audiovisual or image content already in existence without requiring preprocessing by desktop publishing software suites and increased file sizes to handle the header embedded seam carving sequence such as taught by S. Aviden.

It would be evident to one skilled in the art that the path selection step resulting in third pixel path 765C could have selected from four potential paths, $S(1,3) \rightarrow S(2,2) \rightarrow S(3,3) \rightarrow S(4,2) \rightarrow S(5,1); S(1,3) \rightarrow S(2,2) \rightarrow S(3,3) \rightarrow S(4,2) \rightarrow S(5,2); S(1,3) \rightarrow S(2,2) \rightarrow S(3,3) \rightarrow S(4,3) \rightarrow S(5,2); S(1,3) \rightarrow S(2,2) \rightarrow S(3,3) \rightarrow S(4,2) \rightarrow S(5,4).$ Optionally the pixel path content aware image resizing process may have secondary routing protocols that establish which of these to select preferentially. For example the secondary protocol may be to avoid vertical pixel combinations wherever possible, thereby removing $S(1,3) \rightarrow S(2,2) \rightarrow S(3,3) \rightarrow S(4,3) \rightarrow S(5,2)$ as an option, or seeks to remove pixels at the edge of the image thereby favoring $S(1,3) \rightarrow S(2,2) \rightarrow S(3,3) \rightarrow S(4,2) \rightarrow S(5,1)$.

Figure 8:
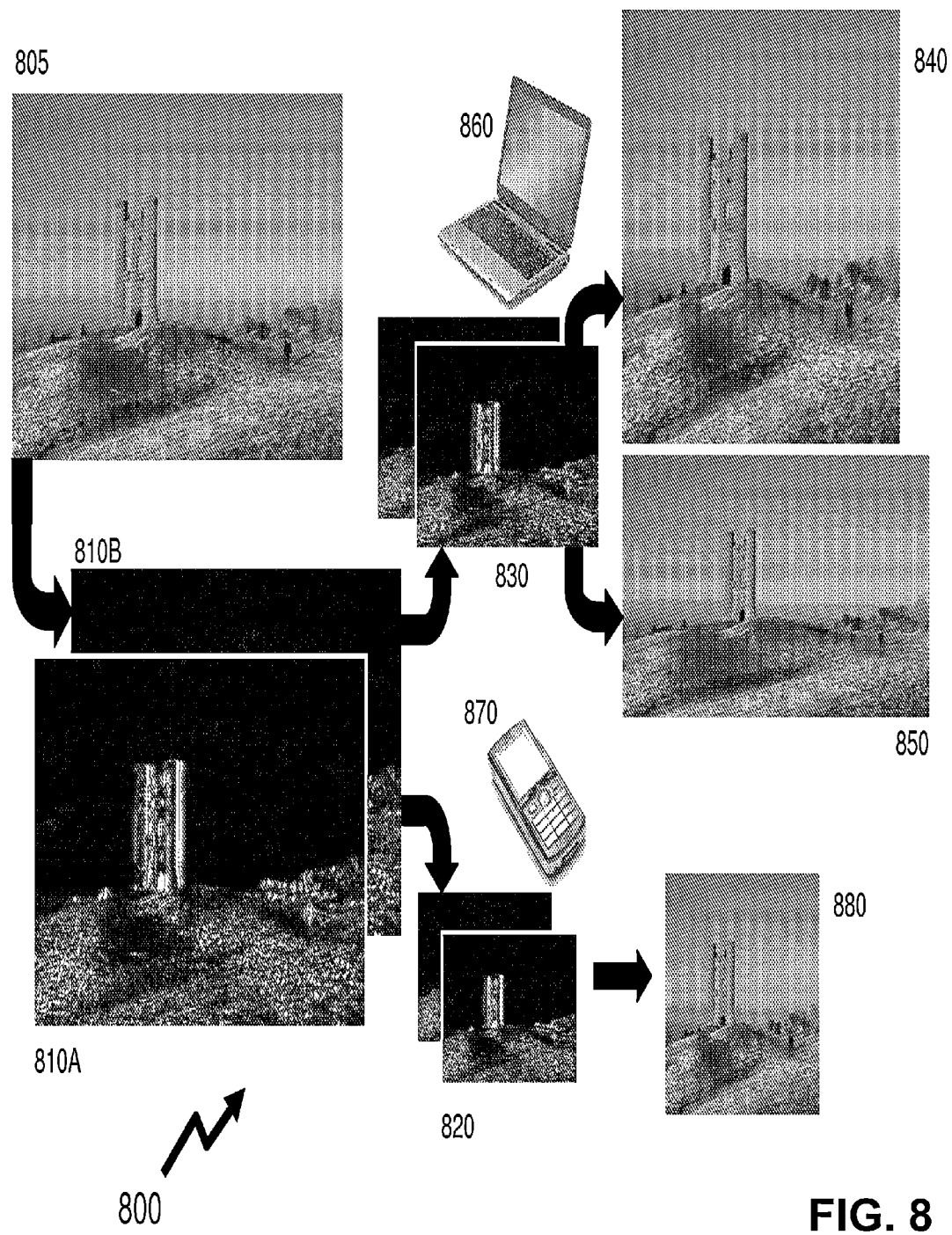
FIG. 8 depicts an embodiment of the invention wherein pixel path selection is determined from different second reduced gradient maps which are derived from a common first gradient map.

Referring to FIG. 8 there is depicted according to an embodiment of the invention image process flow 800 wherein pixel path selection is determined from one of two different second reduced saliency maps, being first and second reduced saliency maps 820 and 830 respectively, wherein each second saliency map is derived from a common first saliency map 810. According a source image 805 provides the pixel intensity array I(i, j) that acts as the source data for calculating $Saliency_{horizontal}(n_{i,j})$ and $Saliency_{vertical}$ which form the basis of horizontal saliency map 810A and vertical saliency map 810B. This step in the process flow being common to two users, one on a laptop computer 860 and another on a cellular telephone 870. The process in execution upon the laptop computer 860 generates a first pair of reduced saliency maps 830 which are then used to generate dynamically scaled first and second resized images 840 and 850 as the user adjusts the onscreen dimensions of a web browser whose content includes the source image 805.

In contrast the process in execution upon a cellular telephone 870 generates a second pair of reduced saliency images 820 that are then used to generate third resized image 880. Accordingly the process runs on the two different devices in a manner that adjusts to suit the device upon which it is executing. It would be evident to one skilled in the art that a resizing operation geared to a 240×320 pixel 2.1" cellular telephone 870 display has different requirements to one displaying images upon a 17" 1920×1080 display on a laptop computer 860. As a result the process according to embodiments of the invention allows for content aware image resizing that is configurable to the device upon which the process is operating. This configurable processing is not contained within the prior art content aware resizing approaches discussed supra.

Figure 9:
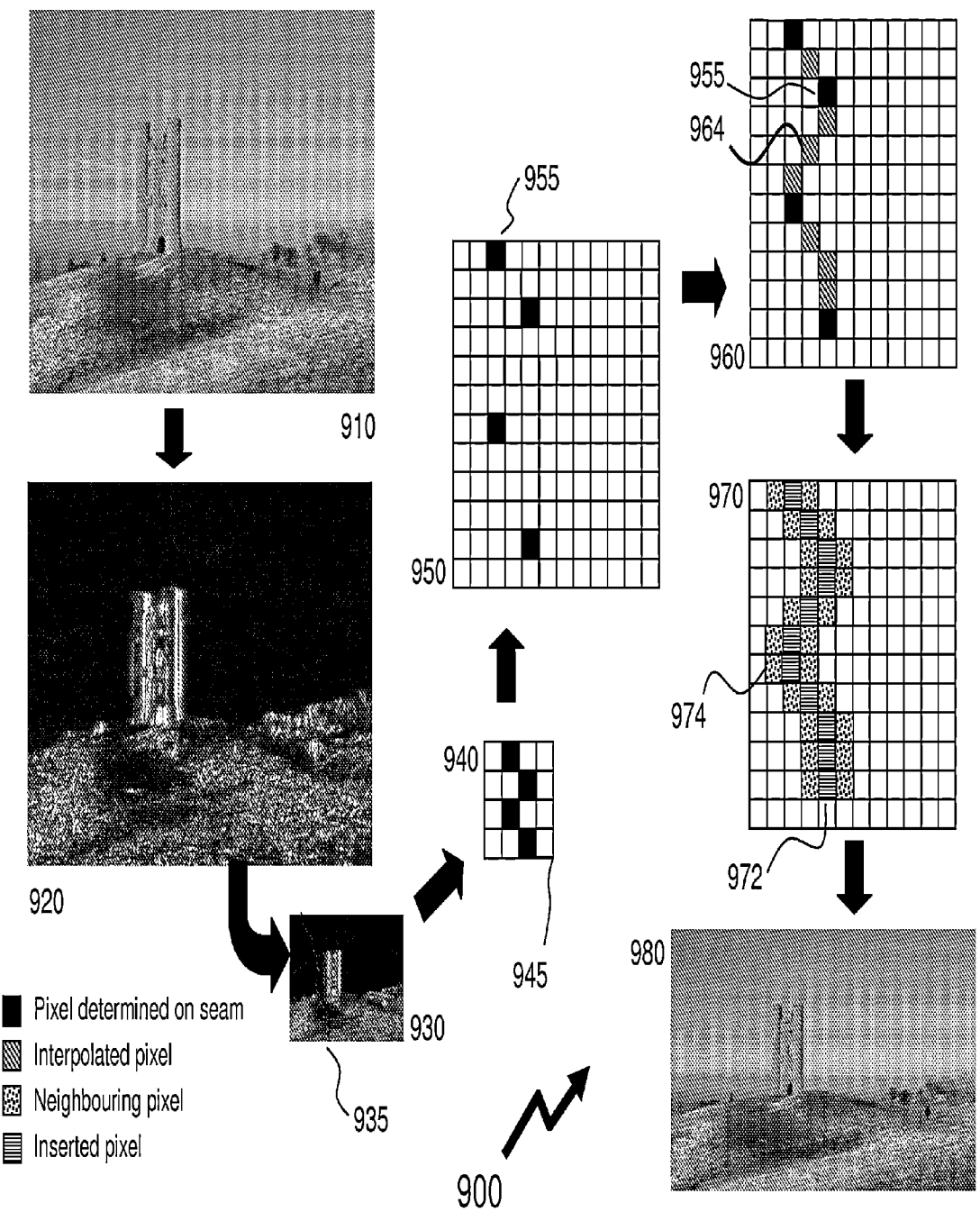
FIG. 9 depicts an embodiment of the invention wherein pixel path selection is made within a second reduced gradient map and interpolated for image adjustment during image resizing.

Now referring to FIG. 9 there is depicted a flow 900 according to an embodiment of the invention wherein pixel path selection is made within a second reduced saliency map and interpolated for image adjustment during image resizing. As such there is shown a source image 910 upon which a resizing operation is to be performed, the intensity data $I(i, j)$ of which is employed in generating first saliency map 920 from which second reduced saliency map 930 is generated. The second reduced saliency map 930 is then the data source for the pixel path determination process, such as presented supra in respect of FIGS. 7A, 7B and 7C. A pixel path portion 940 of the determined pixel path 935 from second reduced saliency map 930 is shown comprising a 4×4 matrix with selected pixels 945 infilled. Within this example scaling between first saliency map 920 and second reduced saliency map 930 is a factor of 3. As such pixel path portion 940 is scaled back by a factor of 3 to generate expanded pixel path 950 within which selected pixels 945 are shown as highlighted pixels 955.

Next flow 900 executes an interpolation process to generate interpolated pixel map 960 wherein the selected pixels 955 are shown together with interpolated pixels 964. Next each selected pixel 955 and interpolated pixel 964 are replaced by pixel path element 972 which are determined as the average of each neighbouring pixel 974, i.e. $P(i, j)=(I(i-1, j)+I(i+1, j))/2$. The pixel path elements 972 are then inserted into the original image 910 to generate resized image 980. It would be evident that within FIG. 9 the flow 900 described relates to an increase in image dimensions as opposed to a reduction. Accordingly the process described in FIGS. 7C and 7D supra for selecting sequential paths and removing them to reduce a dimension may be applied in reverse and multiple pixel paths inserted into the image. Accordingly rather than the saliency maps and reduced salience maps decreasing in dimension they would increase. It would evident to one skilled in the art that generation of pixel path elements 972 may be varied, such as for example rather than using the average of neighbouring pixels the value inserted is that representing the pixel with the minimum value between the neighbouring pixels 974 and interpolated pixel 964.

Figure 10:
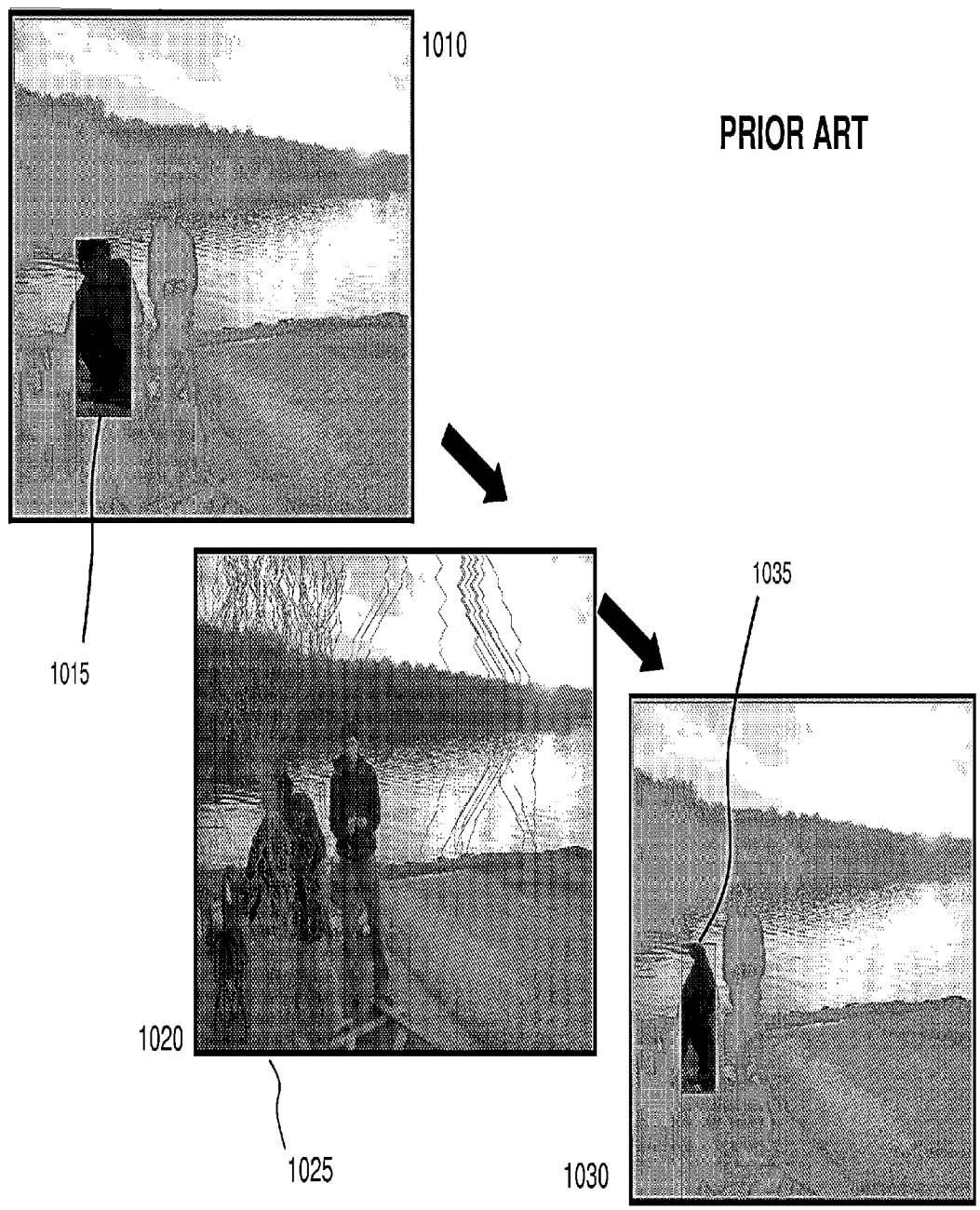
FIG. 10 depicts a limitation within the prior art of S. Aviden in U.S. Pat. No. 7,477,800 wherein seam carving removes pixels with significant image content.

Now referring to FIG. 10 there is depicted a limitation within the prior art of S. Aviden in U.S. Pat. No. 7,477,800 wherein seam carving removes pixels with significant image content. As shown a source image 1010 is presented that contains a first region 1015 of very little variation, being an item of clothing for one of the two individuals within the source image 1010. The prior art of S. Aviden was employed by W. Wedler for this source image 1010 (see Image Resizing by Seam Carving—Project 2—Computational Photography at Carnegie Mellon University, http://www.cs.cmu.edu/afs/andrew/scs/cs/15-463/f07/proj2/www/wwedler). Shown in second image 1020 are multiple seams 1025 determined for an image reduction process wherein a majority of the multiple seams 1025 run through the first region 1015 As a result when these seams are removed to generate resized image 1030 the first region 1015 is removed preferentially resulting in second region 1035 which has essentially removed the majority of the torso of the individual within the image. As discussed supra in respect of FIG. 7A an automated resizing process upon a device may having generated a first saliency map or second reduced saliency map according to the invention have identified that a substantial region within the map that had low saliency, namely first region 1015, such that pixel paths would preferentially pass through it, for example by comparing saliencies calculated using for example Equation (3) with either Equation (5C) or (5D), or through another process. In these circumstances either replacing saliencies with a predetermined value such that these pixels were not preferentially selected or removing paths calculated through these pixels would result in retention of such a region.

Figure 11:
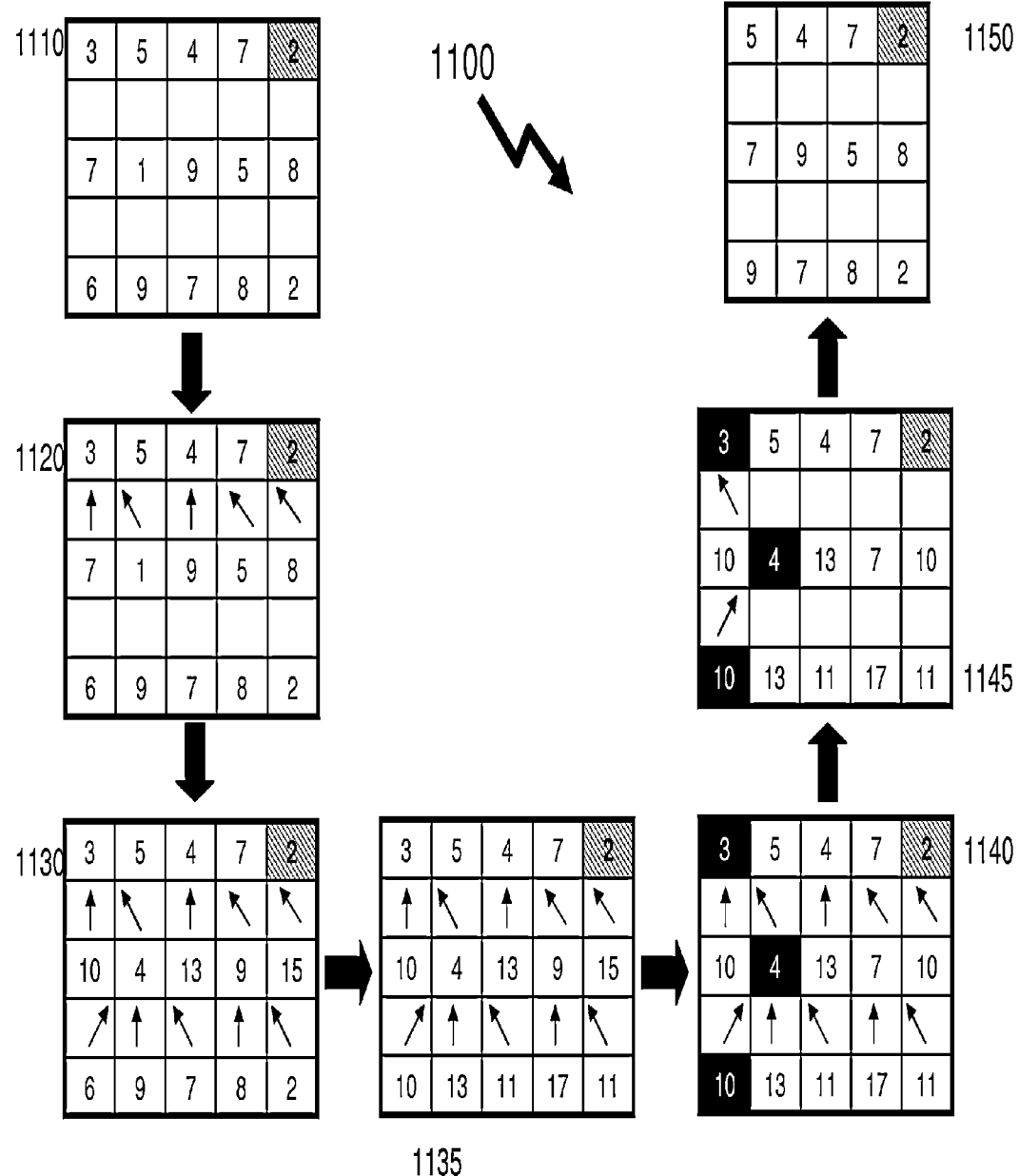
FIG. 11 depicts an embodiment of the invention within an authoring environment wherein significant image content is protected from selection in the pixel path determinations for image resizing.

Within a desktop publishing application such a restriction may be made using a mask applied to the second reduced saliency map from which the pixel paths are selected. Such an approach according to an embodiment of the invention within an authoring environment is shown in FIG. 11 wherein there is depicted a process flow 1100 establishing a pixel path within a saliency map, subsequently referred to as pixel maps. The process starts with first pixel map 1110 of dimension 5×3, which represents a subset of a saliency map such as second reduced horizontal saliency map 630 or second reduced vertical saliency map 635 in FIG. 6 supra for example. The process then determines the interconnected paths between the pixels on the first row and the second, resulting in second pixel map 1120 which shows this connectivity between the first row and second row. However, $S(1,5)=|I(i, j+1)-I(i, j-1)|=2$ for example, has been masked, shown by hatching in that cell in first and second pixel maps 1110 and 1120 respectively. As such the connectivity mapping between the first and second rows does not include $S(2,5) \rightarrow S(1,5)$ such that when the process sums these paths giving the middle summation in third pixel map 1130 this path is not calculated or mapped. Third pixel map 1130 also showing connectivity mapping between the summed second row and third row. The resultant summation path for the 5×3 array being shown in fourth pixel map 1135 along with the connectivity paths from each row to the next. According to an embodiment of the invention process flow 1100 is set to detect the minimum summation in the pixel path and thereby determines this is in the summed path shown in fifth pixel map 1140.

The selected path as shown in fourth pixel map 1140 being $S(1,1) \rightarrow S(2,2) \rightarrow S(3,1)$ whereas in FIG. 7A supra using the same pixel map, without the masking applied to $S(1,5)$, the path selected was $S(1,5) \rightarrow S(2,4) \rightarrow S(3,5)$. Accordingly the pixels within the subset of the saliency map are selected as depicted by sixth pixel map 1145 which are then removed by the process to generate seventh pixel map 1150 which is now of dimension 4×3 with $S(1,5)=2$ still protected for subsequent pixel map operations. It would be evident that rather than limiting the connectivity mapping aspect of the process flow that alternatively the saliency value stored may be replaced with a saliency value that would remove the pixel from summed routes. For example where the pixel path process seeks a minimum summation making the protected pixels have high saliency would remove then from the pixel path selection, similarly where the pixel path process seeks a maximum summation making the protected pixels have low saliency would remove then from the pixel path selection. Other options would be apparent to one of skill in the art.

Figure 12:
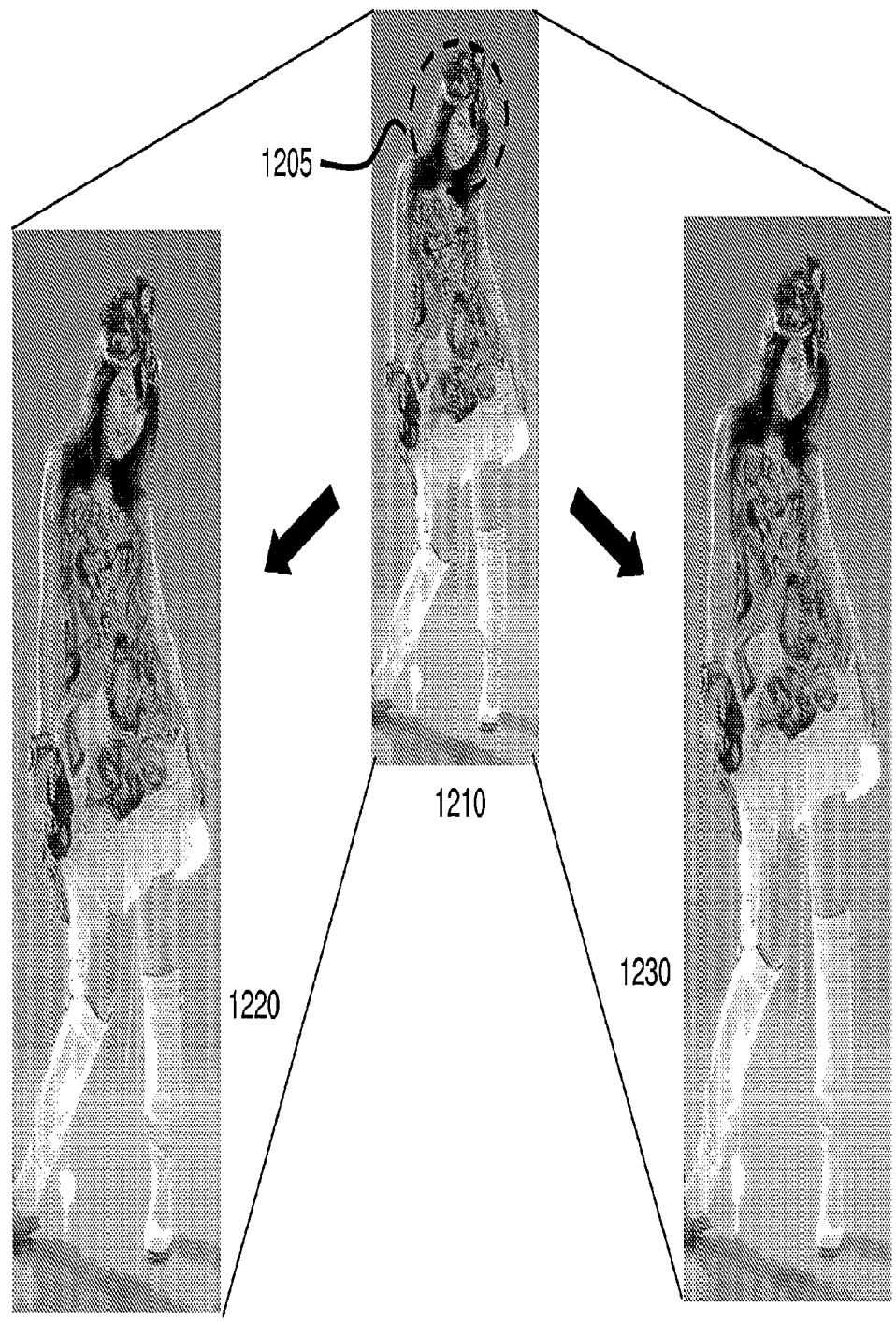
FIG. 12 depicts results of prior art linear scaling and an embodiment of the invention wherein a portion of a person's body is protected during the image resizing.

Referring to FIG. 12 there are depicted the results of prior art linear scaled 1220 and an embodiment of the invention in content aware scaled image 1230 as applied to an original image 1210. In linear scaled 1220 the woman's face is distorted whereas by protecting this portion 1205 of the original image 1210 the content aware scaled image 1230 has a woman with a longer body as desired but with a natural head proportion.

Figure 13:
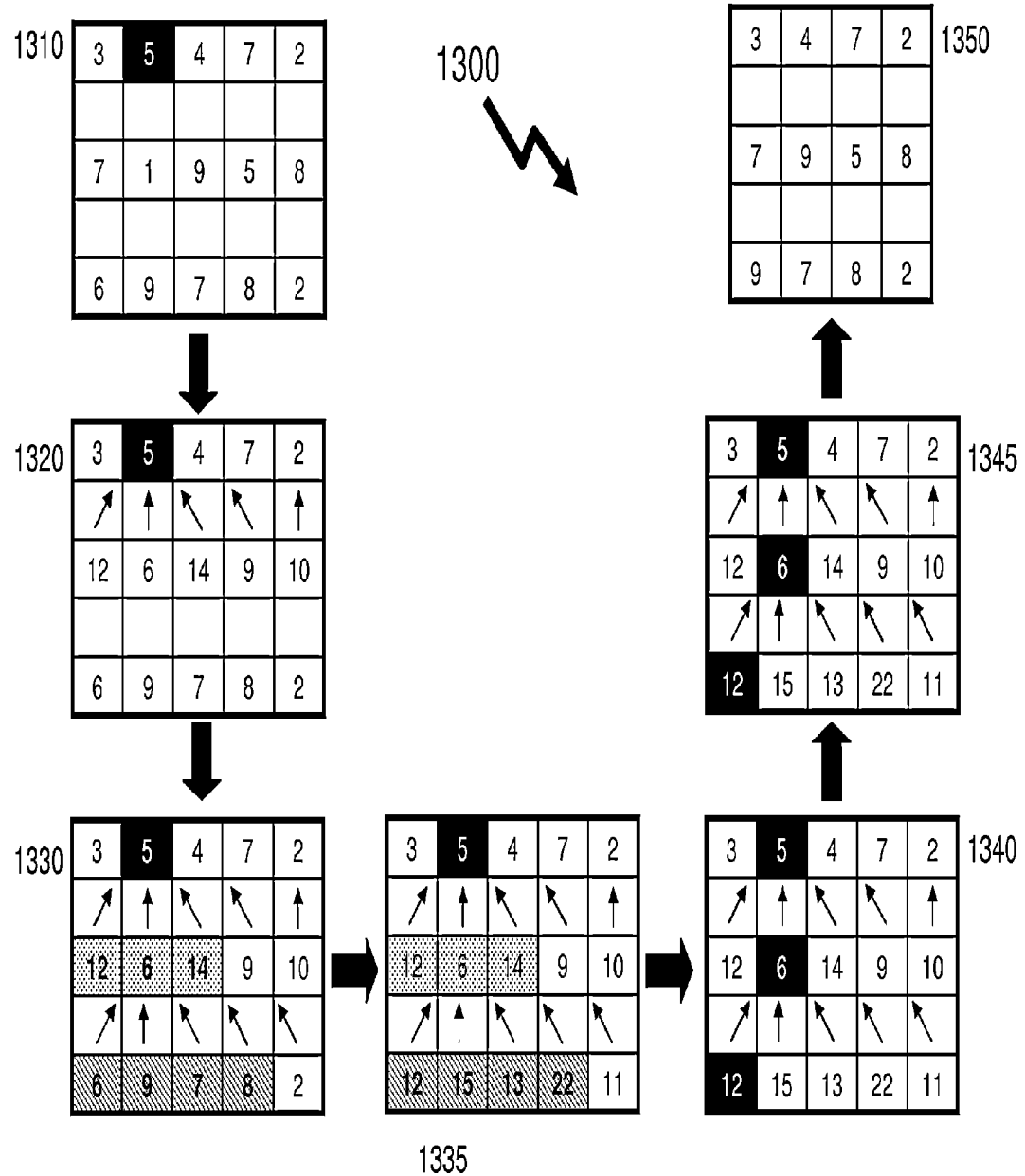
FIG. 13 depicts an embodiment of the invention within an authoring environment wherein image content is preferentially selected in the pixel path determinations for image resizing.

In other authoring applications it may be appropriate to remove content preferentially. Such a process 1300 is depicted in FIG. 13 according to an embodiment of the invention. The process starts with first pixel map 1310 of dimension 5×3, which represents a subset of a saliency map such as second reduced horizontal saliency map 630 or second reduced vertical saliency map 635 in FIG. 6 supra for example. The process then determines the interconnected paths between the pixels on the first row and the second that are connected, resulting in second pixel map 1320 which shows this connectivity between the first row and second row. However, whilst connectivity S(2,2)→S(1,1) represents a lower summation than S(2,2)→S(1,2) the process 1300 forces this connectivity so that pixel S(1,2) is contained within the calculated summations. S(1,2)=I(i, j+1)−I(i, j−1) |=5 for example, has been masked, shown by shading in that cell in first and second pixel maps 1310 and 1320 respectively. As such the connectivity mapping continues to third pixel map 1330 showing connectivity mapping between the summed second row and third row. The resultant summation path for the 5×3 array being shown in fourth pixel map 1335 along with the connectivity paths from each row to the next. According to an embodiment of the invention process flow 1300 is set to detect the minimum summation in the pixel path and thereby determines this is in the summed path provided in fifth pixel map 1340.

The selected path as shown in fourth pixel map 1340 being S(1,2)→S(2,2)→S(3,1) whereas in FIG. 7A supra using the same pixel map without the masking to S(1,S) being applied the path selected was S(1,S)→S(2,4)→S(3,5). Accordingly the pixels within the subset of the saliency map are selected as depicted by sixth pixel map 1345 which are then removed by the process to generate seventh pixel map 1350. It would be evident that rather than limiting the connectivity mapping aspect of the process flow that alternatively the saliency value stored may be replaced with a saliency value that would removes the pixel from summed routes. For example where the pixel path process seeks a minimum summation making the preferred pixels have low saliency, i.e. zero, would preferentially weight to these pixels in pixel path selection, similarly where the pixel path process seeks a maximum summation making the protected pixels have high saliency would remove then from the pixel path selection. Other options would be apparent to one of skill in the art. Such options may in some circumstances force the pixel path selection to these pixels even when local pixel paths may have had summations that previously weighted path selection to them.

Figure 14:
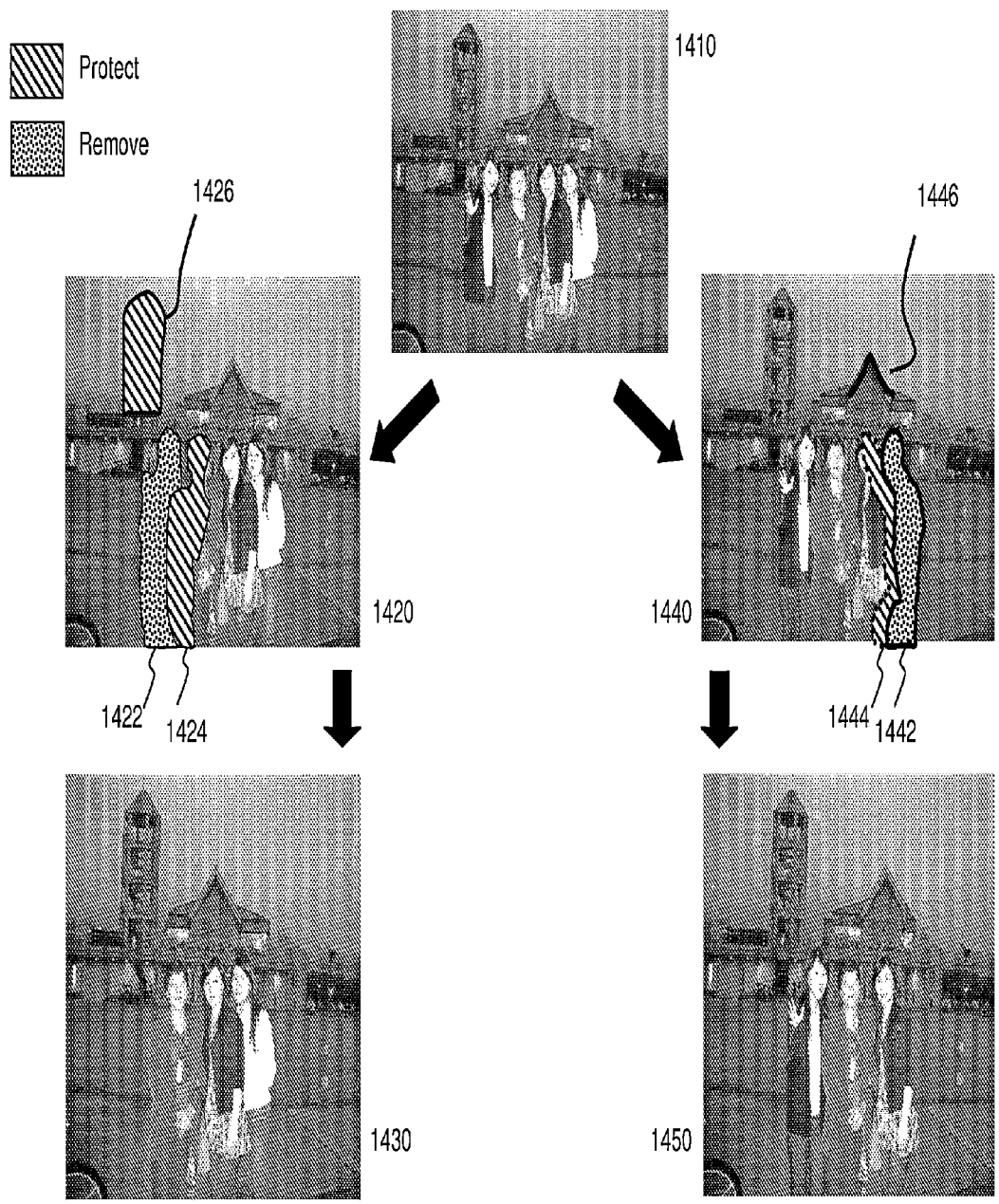
FIG. 14 depicts an embodiment of the invention wherein within an authoring environment image content is identified by the user as being preferentially removed and protected in the pixel path determinations and image resizing.

Now referring to FIG. 14 there is depicted an embodiment of the invention wherein within an authoring environment image content within a source image 1410 is identified by the user as being both preferentially removed and protected in the pixel path determinations and image resizing. Accordingly in first image 1420 the user has selected the far left individual for removal with first removal mask 1422, but being conscious of the middle left individual and the background tower has protected these with first and second protection masks 1424 and 1426 respectively. Then applying a content aware image resizing process according to an embodiment of the invention yields first output image 1430 wherein the selected individual has been removed but the overall content has minimal artifacts to indicate to a viewer that the image was processed.

An alternate authoring is shown in second image 1440 where the user has selected the far right individual for removal with second removal mask 1442, but being conscious of the middle right individual and the background building has protected these with third and fourth protection masks 1424 and 1426 respectively. Then applying a content aware image resizing process according to an embodiment of the invention yields second output image 1450 wherein the selected individual has been removed but the overall content has minimal artifacts to indicate to a viewer that the image was processed.

It was noted supra that a content aware image resizing process according to embodiments of the invention may be deployed within a range of electronic devices including portable devices allowing the process to resize images retrieved by users rather than requiring all images they access be authored in a suite providing header encoded seam carving sequences such as taught within the prior art by S. Aviden. Referring to FIG. 15 there is depicted a process flow 1500 according to an embodiment of the invention wherein pixel path determination for content aware image resizing is executed upon a portable device in dependence upon characteristics of the portable device. As such the process begins at step 1502 where the user opens a web browser interface, or accesses the Internet and retrieves a web page through a specific Internet access application such as the browsers within Blackberry and iPhone PDAs rather than Windows Internet Explorer, Mozilla, etc. As such in step 1504 they access a web page and as part of that digital content relating to an image is downloaded in step 1506. The application in execution upon the user's electronic device establishes the display dimensions for the downloaded image in step 1508 and then in step 1510 retrieves device settings relating to the portable device the user is using, not shown for clarity.

Subsequently in step 1512 the image scaling ratio required for the image is determined and then, based upon the device settings and image, scaling the scaling ratio of the reduced saliency pixel map is determined in step 1514. Next in step 1516 the horizontal saliency map 1H is generated, and subsequently in step 1518 the vertical saliency map IV is calculated. These together with the scaling ratio of the saliency maps determined in step 1514 are used to calculate horizontal reduced saliency map 2H and vertical reduced saliency map 2V in steps 1520 and 1522. In step 1524 a counter is set, X=1, and in step 1526 applicable pixel paths within reduced saliency horizontal and vertical maps 2H(X) and 2V(X) respectively are determined. Next in step 1528 these pixel paths are scaled as appropriate, such as discussed supra in respect of FIG. 9 and then an interpolation is performed in step 1530 to establish the applicable horizontal and/or vertical seams. In step 1532 these interpolated pixels are replaced by "proper" pixels which are generated using the neighboring pixels according to a predetermined algorithm.

This determined pixel seam is then applied to the image in step 1534 and the pixel path is then applied to the saliency maps 1H(X) and 1V(X) as appropriate in step 1536. Then in step 1538 the process determines whether the image size required has been achieved, which if it has results in the process moves to step 1542 and terminating. If further resizing is required the process moves to step 1540, increments the counter, X=X+1, and loops back to step 1520 so that the process can continue such as described for example in respect of FIG. 10, which as outlined allows multiple pixel path selection without recalculation of the saliency energy map such as outlined supra.

It would be evident to one skilled in the art that the characteristics of the portable device retrieved in the process flow and impacting the content aware resizing process may be other than display dimensions and may include but not be limited to processor speed, processor loading with other applications, graphics display driver settings, and battery status. For example, a low resolution display combined with a low processor speed may result in employing a high scaling ratio between saliency map and reduced saliency map whilst high resolution display and high processor speed may typically employ a low scaling ratio unless the battery status is of a low battery wherein minimizing processing may become more important such that a high scaling ratio IS again employed. Other combinations and eventualities would be evident to one of skill in the art.

It would be apparent that under some circumstances it would be desirable to perform the pixel path based content aware resizing in a manner that is less precise or faster than described in respect of embodiments presented supra in respect of FIGS. 6 through 15. Referring to FIG. 16 there is depicted a process 1600 wherein pixel path determination is made upon a reduced second saliency map according to an embodiment of the invention which is a variant of FIG. 9 and provides reduced processing complexity and improved speed. Hence, as with the supra embodiments a source image 1610 is initially converted to a first saliency map 1620 which is then scaled, by a factor N, to provide reduced saliency map 1630. The embodiment in FIG. 16 does not specifically address horizontal and vertical versions of the first saliency map 1620 and reduced saliency map 1630 for simplicity. Accordingly as presented supra in respect of FIG. 9 the process determines a pixel path 1640 comprising pixels 1645, but now in generating scaled pixel path 1650 rather than discrete pixels being selected and the path interpolated the scaled pixel path has N×N pixels selected as groups 1655, where N was the scaling ratio applied to the first saliency map, such that the pixel path is N pixels wide and continuous across the image. As such a single pixel path removal step removes N pixels in either the horizontal or vertical direction thereby reducing the processing by a factor of N. It would evident to one skilled in the art that the factor N as discussed supra in respect of FIG. 8 may be dynamically determined based upon static characteristics of the device but also optionally dynamic aspects of the device such as processor load and battery status for example.

Figure 17:
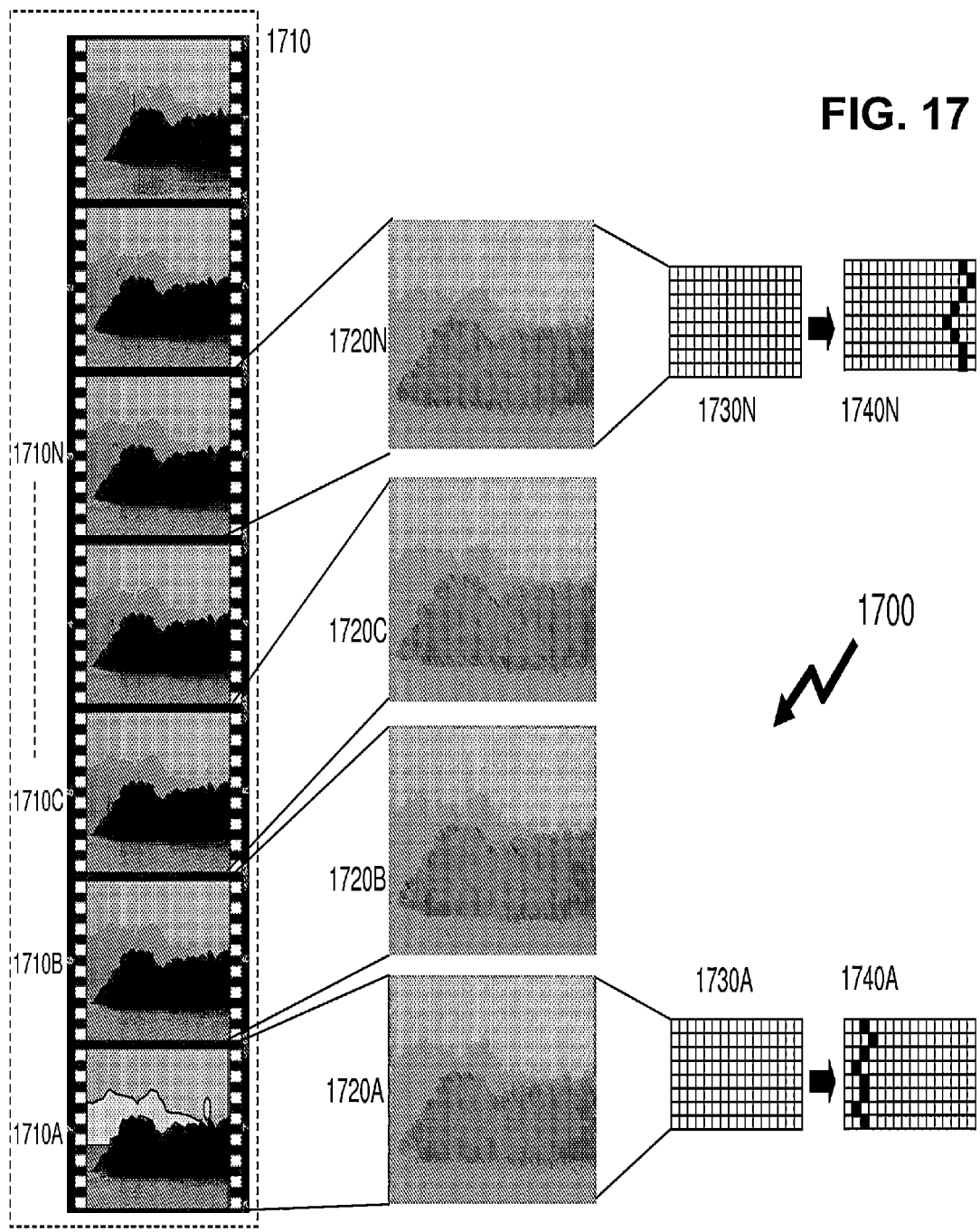
FIG. 17 depicts an embodiment of the invention wherein pixel path determination based upon the reduced second gradient map is performed within a video authoring or display environment.
Figure 18:
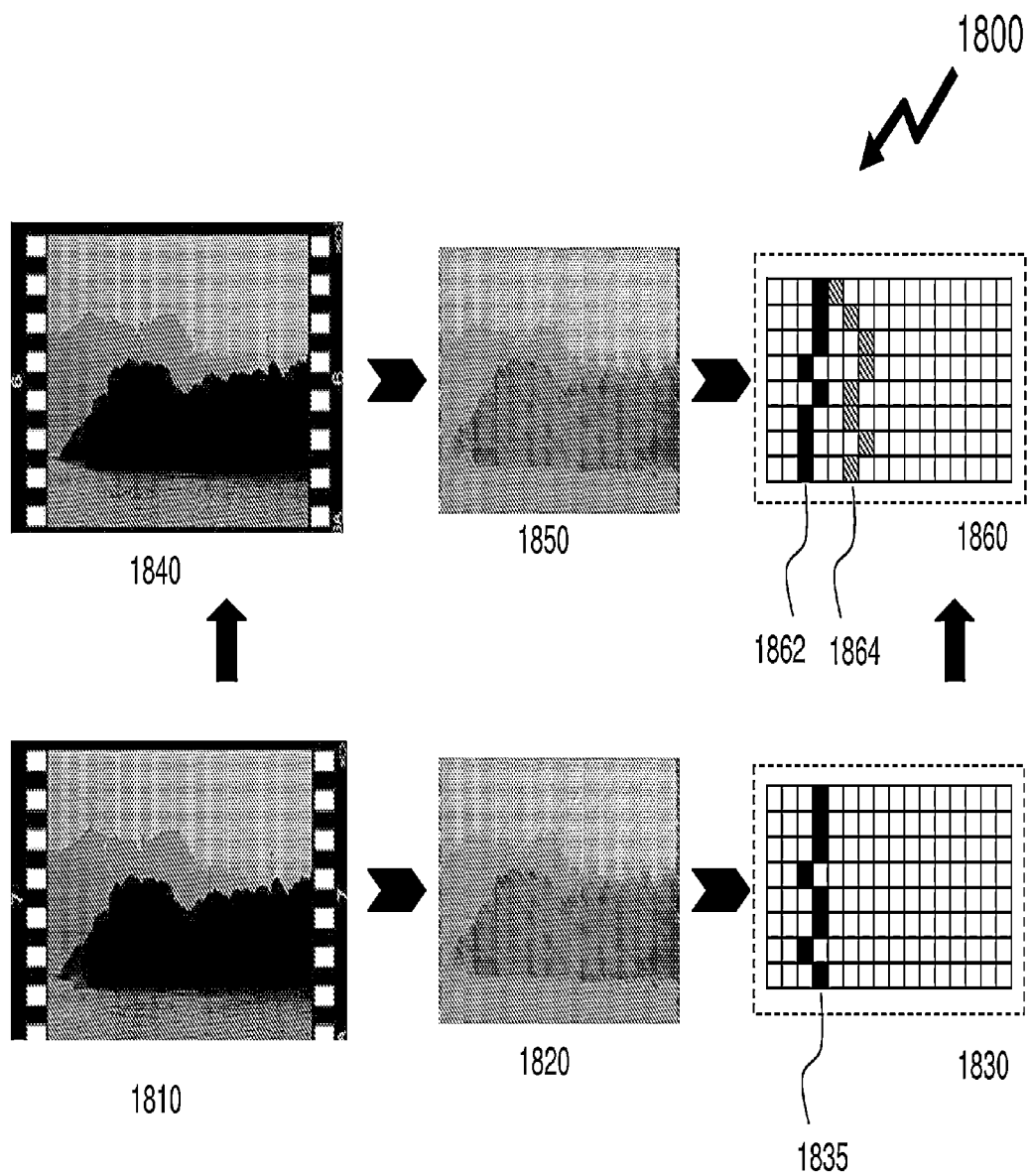
FIG. 18 depicts protection of image content from selection during pixel path determination within image resizing according to an embodiment of the invention.

Within the embodiments presented supra the consideration has been to digital content that relates to images and hence of a static content temporally unless resized by the activities of the user. However, it would be evident that the digital content accessed by users may include additionally audiovisual content such as downloaded or streamed according to international video standards such as Audio Video Interleave (AVI), Movie Picture Experts Group (MPEG, e.g. mp4), and Windows Media Video (WMV). Referring to FIG. 17 there is depicted a process 1700 relating to multiple pixel path selection for content aware image resizing of audiovisual data. Hence there is shown an audiovisual sequence 1710 comprising a series of "frames" 1710A through 1710N. As first "frame" 1710A is received it is converted to first saliency map 1720A which is then converted to first reduced saliency map 1730A as discussed supra in respect to other embodiments of the invention, and then the pixel path(s) is/are selected as shown in first path map 1740A. Such a sequence may be repeated for each "frame" such as shown for $N^{th}$ frame 1710N wherein the Nth saliency map 1720N is generated, converted to $N^{th}$ reduced saliency map 1730N resulting in Nth path map 1740A.

Such a process 1700 may exploit any of the adaptations identified within the preceding embodiments of the invention in FIGS. 6 through 16 to adapt to the scenario of audiovisual content presentation and/or authoring. Optionally the same reduced saliency map may be applied for several "frames" to reduce processing complexity. It would be apparent that potentially allowing the content aware resizing to operate independently upon each "frame" may result in perceivable discontinuities. As such automated dynamic masking for protection/deletion of elements of the image such as discussed supra in respect of FIGS. 11 through 14 may be considered. Such an automated processing for example being based upon recognizing an approximate repetitive feature in the saliency map or reduced saliency maps. Alternatively preference within a pixel path determination of a subsequent "frame" is weighted according to previous pixel paths. Such an approach being illustrated in FIG. 18 where a first "frame" 1820 through generation of a first saliency map 1820 results in the selection of a first pixel path 1835 within first reduced saliency map 1830. Processing of a subsequent "frame" 1840 through second saliency map 1850 and second reduced saliency map 1850 results in identification of second and third pixel paths 1862 and 1864 respectively. However, process 1800 applies a weighting to each of the second and third pixel paths which in this embodiment is determined pixel path 1835. As shown second pixel path 1862 differs in 2 pixels selected but third pixel path 1864 differs in 8. Hence, the weighting for second pixel path 1862 would be higher as it matches more closely to first pixel path 1835 thereby lending to a reduction in visual discontinuities perceived by the viewer.

It would be apparent to one skilled in the art that the embodiments presented supra have typically been described with an initial generation of a first saliency map and then the generation of a reduced saliency map. Alternatively the reduced saliency map may be generated without the storage or maintenance of the first saliency map. It would also be apparent that the scale between first saliency map and reduced saliency energy map has been presented as a constant within the above-described embodiments. Optionally the scale may be varied across the image, such non-linear scaling being optionally predetermined or established in dependence upon characteristics of the device displaying the image or content of the image. Alternatively the scaling may be varied between the vertical and horizontal directions of the image.

In the above embodiments recalculation of the saliency map has been presented as occurring at the initialization of the process and that subsequently reduced saliency maps are employed in determining the pixel paths. It would be apparent to one skilled in the art that substantial image resizing may make it beneficial to perform a recalculation of the saliency map at a predetermined point in the process; this may optionally be a number of pixel seam adjustments or a percentage of the image adjustment for example. In the above embodiments discussion with respect to a particular format are for discussion purposes only as the embodiments are applicable to audiovisual content in multiple formats and multiple standards.

In the above embodiments where adjustment of the process has been presented this has been considered primarily from the perspective of adjusting the process in dependence upon characteristics of the device upon which it is being executed. Optionally the process may be adjusted in respect to the audiovisual content itself, for example a different scaling process may be applied to JPEG files than is applied to TIFF files.

In the above embodiments the process has been described by consideration of different saliency maps and reduced saliency maps for the horizontal and vertical aspects of the image resizing. It would be evident to one skilled in the art that the process may alternatively be performed with single reduced saliency "maps" (i.e. a three-dimensional arrays for example) wherein each pixel within each reduced saliency map for example is a different plan, i.e. G(i, j, k) such that for example k=1 represents the horizontal reduced saliency map and k=2 the vertical reduced saliency map. It would be evident that such an approach may be extended such that additional planes denoted by k relate to alternate saliency calculations, masking data for protection of content, masking data for denoting content to remove etc.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A computer implementable method comprising:
    (a) generating at least one saliency map of a plurality of saliency maps, the at least one saliency map characterized by at least a number of pixels equal to a number of pixels within a source audiovisual content and each pixel within the at least one saliency map having a value associated with it which is determined in dependence upon determining at least a saliency for the corresponding pixel within the source audiovisual content;
    (b) generating at least one reduced saliency map of a plurality of reduced saliency maps, each reduced saliency map associated with a predetermined saliency map of the plurality of saliency maps and generated by applying at least one predetermined scaling factor X, where X>1 and is an integer, to the predetermined saliency map of the plurality of saliency maps thereby reducing at least a dimension of the predetermined saliency map of the plurality of saliency maps by the factor X;
    (c) applying a path determination process to the at least one reduced saliency map, the path determination process for identifying a sequence of pixels within the at least one reduced saliency map that meet a predetermined condition; and
    (d) modifying the source audiovisual content in dependence upon at least the sequence of pixels.

2. A computer implementable method according to claim 1 wherein,
    the at least one saliency map relates to at least one of a horizontal saliency and a vertical saliency for the pixels within the source audiovisual content.

3. A computer implementable method according to claim 1 wherein,
    the predetermined condition comprises at least one of a condition relating to a measure of the sequence of pixels and a condition relating to a measure of the reduced saliency map.

4. A computer implementable method according to claim 1 further comprising:
    (e) modifying the at least one reduced saliency map in dependence upon at least the sequence of pixels; and (f) repeating steps (c), (d) and (e) until a predetermined image condition is met, the predetermined image condition relating to a target final dimension of the source audiovisual content.

5. A computer implementable method according to claim 1 wherein,
    step (d) comprises the steps:
        (i) scaling the sequence of pixels by the predetermined scaling factor X;
        (ii) interpolating a path of pixels including the scaled sequence of pixels; and
        (iii) at least one of removing the interpolated path of pixels from the source audiovisual content and inserting a sequence of proper pixels into the source audiovisual image, the sequence of proper pixels comprising the interpolated path of pixels wherein each pixel in the interpolated path is replaced by a proper pixel determined in dependence upon a process and at least one of the at least one saliency map and the source audiovisual content.

6. A computer implementable method according to claim 1 wherein,
    modifying the source audiovisual content comprises at least one of inserting and removing a predetermined number of pixels along a path within the source audiovisual content, the path determined in dependence upon at least the sequence of pixels.

7. A computer implementable method according to claim 1 wherein,
    the at least one predetermined scaling factor is determined in dependence upon at least a characteristic of at least one of the device upon which the computer implementable method is in execution and the source audiovisual content.

8. A computer implementable method according to claim 7 wherein,
    when the at least one is the device then the characteristic is selected from the group comprising a measure of processor loading, processor type, processor speed, accessible memory, status, display dimension, display resolution, graphics processor, and battery life and when the at least one is the source audiovisual content the characteristic is selected from the group comprising a file format, a measure of anticipated duration of the image on the display, and image dimensions.

9. A computer implementable method according to claim 1 wherein,
    the saliency for the corresponding pixel within the source audiovisual content is determined upon a component of a color space defining the pixel within the source audiovisual content.

10. A computer implementable method comprising:
    (a) generating a saliency map characterized by at least a number of pixels equal to a number of pixels within a source audiovisual content and each pixel within the saliency map having at least two values associated with it, one value determined in dependence upon at least a saliency for the corresponding pixel within the source audiovisual content along a first axis of the image and the other value determined in dependence upon at least a saliency for the corresponding pixel within the source audiovisual content along a second axis of the image;
    (b) generating a reduced saliency map by applying at least one predetermined scaling factor X, where X>1 and is an integer, to the saliency map thereby reducing at least a dimension of the saliency map by the factor X when generating the reduced saliency map, each pixel with the reduced saliency map having at least first data generated in dependence upon at least the one value of a pixel within the saliency map associated with the pixel in the saliency reduced map and second data generated in dependence upon at least the other value of a pixel within the saliency map associated with the pixel in the saliency reduced map;

(c) applying a path determination process to at least one of the first data and the second data within the reduced saliency map, the path determination process for identifying a sequence of pixels within the reduced saliency map that meet a predetermined condition; and (d) modifying the source audiovisual content in dependence upon at least the sequence of pixels.

11. A computer implementable method according to claim 10 wherein, the one value is determined according Saliency(ni,j)=|I(ni,j+1)|−|I(ni,j−1)| and the other value is determined according to Saliency(ni,j)=|I(ni+1,j)|−|I(ni−1,j)| wherein I(ni,j) is a particular pixel within the source audiovisual content.

12. A computer implementable method according to claim 10 wherein, the predetermined condition comprises at least one of a condition relating to a measure of the sequence of pixels and a condition relating to a measure of the reduced saliency map.

13. A computer implementable method according to claim 10 further comprising;

(e) modifying the at least one saliency map in dependence upon at least the sequence of pixels; and (f) repeating step (c), (d) and (e) until a predetermined image condition is met, the predetermined image condition relating to a target final dimension of the source audiovisual content.

14. A computer implementable method according to claim 10 wherein, step (d) comprises the steps:

(iv) scaling the sequence of pixels by the predetermined scaling factor X;

(v) interpolating a path of pixels including the scaled sequence of pixels; and (vi) at least one of removing the interpolated path of pixels from the source audiovisual content and inserting a sequence of proper pixels into the source audiovisual image, the sequence of proper pixels comprising the interpolated path of pixels wherein each pixel in the interpolated path is replaced by a proper pixel determined in dependence upon a process and at least one of the at least one saliency map and the source audiovisual content.

15. A computer implementable method according to claim 10 wherein, modifying the source audiovisual content comprises at least one of inserting and removing a predetermined number of pixels along a path within the source audiovisual content, the path determined in dependence upon at least the sequence of pixels.

16. A computer implementable method according to claim 10 wherein, the at least one predetermined scaling factor is determined in dependence upon at least a characteristic of at least one of the device upon which the computer implementable method is in execution and the source audiovisual content.

17. A computer implementable method according to claim 16 wherein, when the at least one is the device then the characteristic is selected from the group comprising a measure of processor loading, processor type, processor speed, accessible memory, status, display dimension, display resolution, graphics processor, and battery life and when the at least one is the source audiovisual content the characteristic is selected from the group comprising a file format, a measure of anticipated duration of the image on the display, and image dimensions.

18. A computer implementable method according to claim 10 wherein, the saliency for the corresponding pixel within the source audiovisual content is determined from at least an aspect of a color space representation of the pixel.

19. A computer implementable method according to claim 10 wherein, a predetermined portion of at least one of the first data and the second data are at least one of excluded from, preferentially selected in, and modified before path determination process.

20. A device comprising:

(a) an interface for receiving audiovisual content for presentation to a user upon a display forming a predetermined portion of the device, the audiovisual content characterized by at least a source dimension being at least one of a physical dimension and a number of pixels; and (b) a circuit including at least a processor and a memory for executing a series of processes, the processes including at least:

(i) a display process for determining a target dimension for the audiovisual content for presentation to the user; and (ii) an image process for generating a modified image in dependence upon at least the audiovisual content, the target dimension, and the at least a source dimension, the image process comprising the steps of:

1) generating a saliency map characterized by at least a number of pixels equal to a number of pixels within the source audiovisual content and each pixel within the saliency map having at least two values associated with it, one value determined in dependence upon at least a saliency for the corresponding pixel within the source audiovisual content along a first axis of the image and the other value determined in dependence upon at least a saliency for the corresponding pixel within the source audiovisual content along a second axis of the image;

2) generating a reduced saliency map by applying at least one predetermined scaling factor X, where X>1 and is an integer, to the saliency map thereby reducing at least a dimension of the saliency map by the factor X when generating the reduced saliency map, each pixel with the reduced saliency map having at least first data generated in dependence upon at least the one value of a pixel within the saliency map associated with the pixel in the saliency reduced map and second data generated in dependence upon at least the other value of a pixel within the saliency map associated with the pixel in the saliency reduced map;

3) applying a path determination process to at least one of the first data and the second data within the reduced saliency map, the path determination process for identifying a sequence of pixels within the reduced saliency map that meet a predetermined condition; and 4) modifying the audiovisual content in dependence upon at least the sequence of pixels to generate display audiovisual content.

21. A device according to claim 20 further comprising;

(5) modifying the at least one saliency map in dependence upon at least the sequence of pixels; and (6) repeating steps (c), (d) and (e) until the target dimension has been achieved.

22. A device according to claim 20 wherein, step (4) comprises the steps:

scaling the sequence of pixels by the predetermined scaling factor X;

interpolating a path of pixels including the scaled sequence of pixels; and at least one of removing the interpolated path of pixels from the audiovisual content and inserting a sequence of proper pixels into the audiovisual image, the sequence of proper pixels comprising the interpolated path of pixels wherein each pixel in the interpolated path is replaced by a proper pixel determined in dependence upon a process and at least one of the at least one saliency map and the source audiovisual content.

23. A device according to claim 20 wherein, modifying the audiovisual content comprises at least one of inserting and removing a predetermined number of pixels along a path within the audiovisual content, the path determined in dependence upon at least the sequence of pixels.

24. A device according to claim 20 wherein, the at least one predetermined scaling factor is determined in dependence upon at least a characteristic of at least one of the device and the audiovisual content.

25. A device according to claim 24 wherein, when the at least one is the device then the characteristic is selected from the group comprising a measure of processor loading, processor type, processor speed, accessible memory, status, display dimension, display resolution, graphics processor, and battery life and when the at least one is the source audiovisual content the characteristic is selected from the group comprising file format, a measure of anticipated duration of the image on the display, and image dimensions.

26. A computer implementable method according to claim 20 wherein, a predetermined portion of at least one of the first data and the second data are at least one of excluded from, preferentially selected in, and modified before path determination process.

27. The computer implementable method according to claim 1, further comprising (e) prior to executing steps (a) to (d) establishing a target reduction in at least a dimension of the source audiovisual content;

(f) establishing in dependence upon the target reduction in at least a dimension of the source audiovisual content a first factor Y and a number of times N to apply the first factor and if required a second factor Z and a number of times M to apply the second factor;

(g) executing the steps (c), (d) and (e) N times with the factor X set equal to the first factor Y and upon completion of each sequence of steps (c), (d) and (e) modifying the at least one reduced saliency map in dependence upon at least the sequence of pixels; and (h) executing the steps (c), (d) and (e) M times with the factor X set equal to the second factor Z and upon completion of each sequence of steps (c), (d) and (e) modifying the at least one reduced saliency map in dependence upon at least the sequence of pixels.

28. The computer implementable method according to claim 10, further comprising (e) prior to executing steps (a) to (d) establishing a target reduction in at least a dimension of the source audiovisual content;

(f) establishing in dependence upon the target reduction in at least a dimension of the source audiovisual content a first factor Y and a number of times N to apply the first factor and if required a second factor Z and a number of times M to apply the second factor;

(g) executing the steps (c), (d) and (e) N times with the factor X set equal to the first factor Y and upon completion of each sequence of steps (c), (d) and (e) modifying the at least one reduced saliency map in dependence upon at least the sequence of pixels; and (h) executing the steps (c), (d) and (e) M times with the factor X set equal to the second factor Z and upon completion of each sequence of steps (c), (d) and (e) modifying the at least one reduced saliency map in dependence upon at least the sequence of pixels.

29. The device according to claim 20, further comprising (e) prior to executing steps (a) to (d) establishing a target reduction in at least a dimension of the source audiovisual content;

(f) establishing in dependence upon the target reduction in at least a dimension of the source audiovisual content a first factor Y and a number of times N to apply the first factor and if required a second factor Z and a number of times M to apply the second factor;

(g) executing the steps (c), (d) and (e) N times with the factor X set equal to the first factor Y and upon completion of each sequence of steps (c), (d) and (e) modifying the at least one reduced saliency map in dependence upon at least the sequence of pixels; and (h) executing the steps (c), (d) and (e) M times with the factor X set equal to the second factor Z and upon completion of each sequence of steps (c), (d) and (e) modifying the at least one reduced saliency map in dependence upon at least the sequence of pixels.

* * * * *